US012618482B2

(12) United States Patent
Ishibashi et al.

(10) Patent No.: US 12,618,482 B2
(45) Date of Patent: May 5, 2026

(54) VALVE

(71) Applicant: FUJIKIN INCORPORATED, Osaka (JP)

(72) Inventors: Keisuke Ishibashi, Osaka (JP); Akihiro Harada, Osaka (JP); Tadayuki Yakushijin, Osaka (JP); Yusei Horikawa, Osaka (JP); Souta Hachiman, Osaka (JP); Toshiyuki Inada, Osaka (JP); Ryo Sugimura, Osaka (JP)

(73) Assignee: Fujikin Incorporated, Osaka (JP)

( * ) Notice: Subject to any disclaimer, the term of this patent is extended or adjusted under 35 U.S.C. 154(b) by 164 days.

(21) Appl. No.: 18/561,487

(22) PCT Filed: May 24, 2022

(86) PCT No.: PCT/JP2022/021232
§ 371 (c)(1),
(2) Date: Nov. 16, 2023

(87) PCT Pub. No.: WO2022/250046
PCT Pub. Date: Dec. 1, 2022

(65) Prior Publication Data
US 2024/0229940 A1 Jul. 11, 2024

(30) Foreign Application Priority Data

May 27, 2021 (JP) ................................ 2021-088908
Aug. 24, 2021 (JP) ................................ 2021-136007
Jan. 21, 2022 (JP) ................................ 2022-008118

(51) Int. Cl.
*F16K 7/16* (2006.01)
*F16K 31/524* (2006.01)

(52) U.S. Cl.
CPC .......... *F16K 7/16* (2013.01); *F16K 31/52491* (2013.01)

(58) Field of Classification Search
CPC ..... F16K 31/52491; F16K 31/145; F16K 7/16
See application file for complete search history.

(56) References Cited

U.S. PATENT DOCUMENTS 3,053,499 A * 9/1962 Jones ........................ F16K 7/16
251/284
4,421,295 A * 12/1983 Parkison ................... F16K 7/16
251/86
(Continued)

FOREIGN PATENT DOCUMENTS

JP           H04-78 A     1/1992
JP       2005-016599 A     1/2005
(Continued)

OTHER PUBLICATIONS

International Search Report mailed Jun. 28, 2022, issued for PCT/JP2022/021232 and English translation thereof.

*Primary Examiner* — Hailey K. Do
(74) *Attorney, Agent, or Firm* — Howson & Howson LLP

(57) ABSTRACT

The invention provides a valve capable of suppressing unintended valve opening/closing by providing a play state during a manual operation and also enabling smooth transition from the play state to a rotation state. In the valve, a tip of another end portion of the stem and the engagement hole of an operation handle form a corresponding circumferential surface and a planar section continuous to the circumferential surface. Either one of the tip of the other end portion of the stem and the planar section of the engagement hole of the operation handle is formed to have two flat surfaces defining a predetermined angle, and thereby gen- (Continued)

erates predetermined play when the operation handle is rotated in one direction after being rotated in another direction.

14 Claims, 31 Drawing Sheets

(56)                    References Cited

U.S. PATENT DOCUMENTS

| | | | |
|---|---|---|---|
| 5,295,662 A * | 3/1994 | Yamaji | F16K 41/12 |
| | | | 251/274 |
| 7,802,771 B2 * | 9/2010 | Tsubota | F16K 31/1221 |
| | | | 251/63.5 |
| 2008/0302985 A1 * | 12/2008 | Daido | F16K 31/60 |
| | | | 251/81 |
| 2010/0218830 A1 | 9/2010 | Yoon | |
| 2011/0073197 A1 | 3/2011 | Hirose | |
| 2020/0224787 A1 | 7/2020 | Aoyama | |

FOREIGN PATENT DOCUMENTS

| | | | |
|---|---|---|---|
| JP | 2011-074955 A | 4/2011 | |
| JP | 2020-112206 A | 7/2020 | |

* cited by examiner

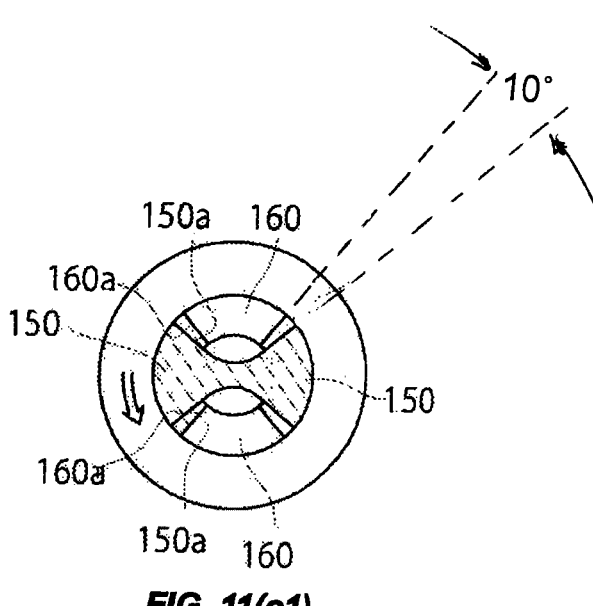
FIG. 11(c1)
FIG. 11(c2)
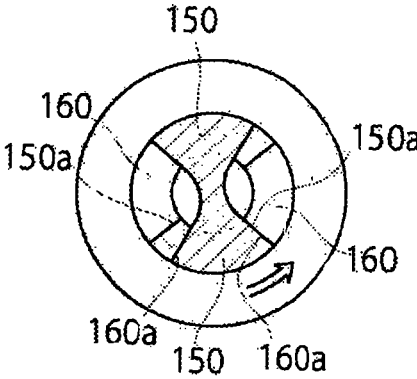
FIG. 11(c3)

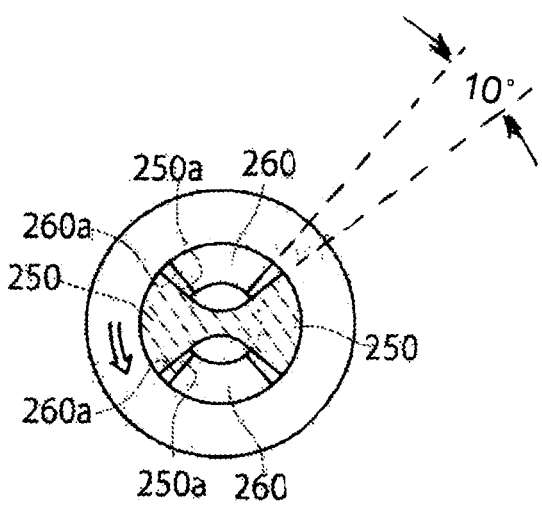
FIG. 17(c1)
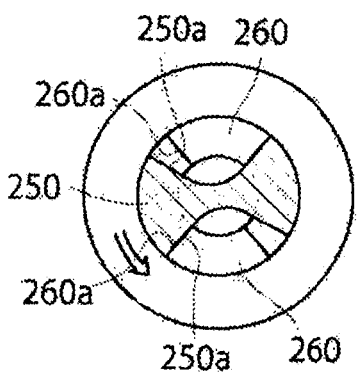
FIG. 17(c2)
FIG. 17(c3)

VALVE

TECHNICAL FIELD

The present invention relates to a valve that controls a flow of a fluid, relate to a manual valve or a hybrid valve that can be opened/closed manually, and particularly relates to a valve that includes a safety mechanism for suppressing opening/closing of the valve caused by vibration or human error.

BACKGROUND ART

An opening/closing valve that is a fluid controller disclosed in PTL 1 enables automatic opening/closing thereof by movement of a stem caused by a pneumatic pressure, and also enables the movement of the stem by using a manual handle. In case of emergency, automatic opening/closing of the valve is disabled by manually rotating an operation handle.

FIG. 19 illustrates an opening/closing valve 301 that is the fluid controller described in PTL 1. In this opening/closing valve 301, a casing 303, which includes a valve body and an actuator for actuating the valve body, is fixed to a valve body 302 formed with a channel and a valve seat therein. The opening/closing valve 301 enables a manual operation thereof by putting a handle member 305 onto an operation member 304 projected from an upper end of the casing 303, and also enables an automatic operation thereof by introducing a working fluid from a working fluid introduction hole 303a.

FIG. 20(a) to (e) illustrate a procedure by the manual operation, and each illustrate a positional relationship between a guide projection 311, which is provided to an upper end portion of the casing 303, and a guide groove 314, which has a substantially inverted U-shape, in the handle member 305. An attachment guide section 317 of the guide groove 314 is formed in a manner to reach a lower end of a cylindrical section 312. Thus, as illustrated in FIG. 20(a) to (c), when a lower end opening of the attachment guide section 317 is fitted to the guide projection 311, the guide projection 311 is guided by the attachment guide section 317 that extends in an up-down direction, and consequently, the entire handle member 305 can move downward. Then, the handle member 305 is engaged with a casing 303 when a small-diameter section 318 that is provided to an upper portion of the attachment guide section 317 is deformed, and the guide projection 311 to passes therethrough.

When being in a state illustrated in FIG. 20(c), the handle member 305 can be rotated within a range where the guide projection 311 is guided by a manual rotation guide section 315 that extends in a circumferential direction, and this rotation, which is generated by operating an operation section 313 of the handle member 305, can rotate the operation member 304. This results in an automatic opening/closing disabled state illustrated in FIG. 20(d). In the state illustrated in FIG. 20(d), when the handle member 305 is lifted, the guide projection 311 is guided by a locked position movement guide section 316, which extends in the up-down direction, and moves relatively downward in the locked position movement guide section 316 while the handle member 305 moves to a position illustrated in FIG. 20(e). In this state, when a stop member, such as a padlock or a wire lock, is inserted in a stopper insertion section 319, the handle member 305 is maintained in a non-rotatable state.

However, such a case is also assumed that a worker walks away from a site while the handle member 305 is not in the non-rotatable state where the handle member 305 is lifted and the stop member is inserted in the stopper insertion section 319. In such a case, when another worker hits the handle member 305, or equipment vibrates, the handle member 305 is possibly rotated, and the valve is possibly opened/closed unexpectedly.

A combination valve that is disclosed in PTL 2 also enables the movement of the stem by the pneumatic pressure and the movement of the stem by the manual handle. In this combination valve, as illustrated in FIG. 21, when a cuboidal projected section 401 is engaged with a groove 402, which has a slightly greater width dimension than this projected section 401, a coupled portion between an upper stem and a lower stem, both of which are coupled to a manually operated handle, transmits rotation of the handle from the upper stem to the lower stem. Then, when the lower stem is threaded to a screw section on an inner circumferential surface of a bonnet, rotary motion is converted to linear motion, and this linear motion can press the valve body toward the valve seat.

At this time, since there is a predetermined clearance between the projected section 401 in an end portion of the upper stem and the groove 402 in an end portion of the lower stem illustrated in FIG. 21, the mere rotation of the upper stem by a predetermined angle (an angle α in an illustrated example) does not transmit the rotation of the handle and the upper stem to the lower stem. With so-called play at this predetermined angle, unexpected opening/closing of the valve can be suppressed even when the worker hits the handle unexpectedly or the equipment vibrates.

CITATION LIST

Patent Literature

PTL 1: JP2005-016599A
PTL 2: JP2020-112206A

SUMMARY OF INVENTION

Technical Problem

The engagement between the upper stem and the lower stem of the combination valve described in PTL 2 is made when a corner section of the projected section 401 abuts a planar section of the groove 402. Thus, the abutment is a linear contact, and possibly interferes with opening/closing when wear of an abutment portion progresses. There is also a problem that, since the rotation occurs from the abutment by the linear contact, the worker senses non-smooth transition from an unloaded play state to a loaded rotation state.

The invention has been made in view of such points and therefore has a purpose of providing a valve capable of suppressing unintended valve opening/closing by providing a play state during a manual operation without increasing the number of components and also enabling smooth transition from the play state to a rotation state. The invention also provides a valve that exerts a stopper function at fully closed/fully open positions without a need for work to lift an operation handle.

Solution to Problem

A valve according to the invention (1) that is obtained to solve the above problems is a valve that includes: a valve body that is formed therein with a fluid channel and a valve seat arranged in the fluid channel; a diaphragm that abuts and separates from a seat surface of the valve seat; a hollow bonnet that fixes a circumferential edge of the diaphragm to the valve body; a diaphragm presser that abuts the diaphragm and presses the diaphragm to the valve seat side; and a stem, one end portion of which is formed with a male screw on an outer circumferential surface, and another end portion of which is projected from the bonnet and is engaged with an engagement hole, the male screw being threaded to a female screw formed on an inner circumferential surface of the bonnet, and the engagement hole being formed in a central portion of an inner surface of an operation handle, and in which a tip of the other end portion of the stem and the engagement hole form a corresponding circumferential surface and a planar section continuous to the circumferential surface, and either one of the tip of the other end portion of the stem and the planar section of the engagement hole has two flat surfaces defining a predetermined angle, and thereby generates predetermined play when the operation handle is rotated in one direction after being rotated in another direction. In a valve according to the invention (2), a cylindrical engagement member that is engaged with the engagement hole can be attached to the tip of the other end portion of the stem.

According to the invention, unintended valve opening/closing can be suppressed by providing the predetermined play in an engagement portion between the stem and the operation handle without increasing the number of components.

In this case, the operation handle according to the invention (3) includes an operation section and a cylindrical section that covers the bonnet, an inner circumferential surface of the cylindrical section is formed with a projected guide that is engaged with a groove of a cylindrical indicator fixed to the bonnet, the operation handle is constantly urged by urging means in a direction to cancel engagement between the operation handle and the stem, and the groove can be formed with a circumferential groove and an axial groove in which the guide moves in an axial direction when the valve is in a fully closed or fully open state.

In the operation handle, the guide is rotated along the circumferential groove. When the valve is in the fully closed or fully open state, the guide is located in the axial groove, separates from the circumferential groove by the urging means, and inhibits rotation of the operation handle. At this time, the axial groove has a top surface that inhibits movement of the guide at a position where the operation handle is not detached from the stem, so as to stop the movement of the guide.

In a valve according to the invention (4), a piston and a cylinder can be arranged between the diaphragm presser and the stem, the piston moving in the axial direction by a working fluid.

A valve according to the invention (5) that is obtained to solve the above problems is a valve that includes:

a valve body that is formed therein with a fluid channel and a valve seat arranged in the fluid channel;

a diaphragm that abuts and separates from a seat surface of the valve seat;

a hollow bonnet that fixes a circumferential edge of the diaphragm to the valve body;

a diaphragm presser that abuts the diaphragm and presses the diaphragm to the valve seat side;

a lower stem that is formed with a male screw on an outer circumferential surface, the male screw being threaded to a female screw that is formed on an inner circumferential surface of the bonnet; and an upper stem, one end portion of which is engaged with the lower stem, and another end portion of which is projected from the bonnet and is engaged with an operation handle, in which in an engagement section between the upper stem and the lower stem, either one of end surfaces is formed with a pair of fan-shaped abutment sections, center sides of which are circular arcs, and the other end surface is formed with a projected section, the projected section having: a pair of substantially fan-shaped missing sections, each of which has a longer arc length than the circular arc of the fan-shaped abutment section; and a vertical surface that makes surface contact with a planar lateral surface of the fan-shaped abutment section.

In the valve according to the invention, abutment in an engagement section between the upper stem and the lower stem is a s contributes smooth opening/closing.

In this case, the operation handle according to the invention (6) includes an operation section and a cylindrical section that covers the bonnet, an inner circumferential surface of the cylindrical section is formed with a projected guide that is engaged with a groove of a cylindrical indicator fixed to the bonnet, the operation handle is constantly urged by urging means in a direction to cancel engagement between the operation handle and the upper stem, and the groove can be formed with: a circumferential groove that allows rotation of the operation handle; and an axial groove in which the guide moves in an axial direction when the valve is in a fully closed or fully open state.

In the operation handle, the guide is rotated along the circumferential groove. When the valve is in the fully closed or fully open state, the guide is located in the axial groove, separates from the circumferential groove by the urging means, and inhibits the rotation of the operation handle. At this time, the axial groove has a top surface that inhibits movement of the guide at a position where the operation handle is not detached from the stem, so as to stop the movement of the guide.

A hybrid valve according to the invention (8) that is obtained to solve the above problems is a hybrid valve that includes:

a valve body that is formed therein with a fluid channel and a valve seat arranged in the fluid channel;

a diaphragm that abuts and separates from a seat surface of the valve seat;

a hollow bonnet that fixes a circumferential edge of the diaphragm to the valve body;

a diaphragm presser that abuts the diaphragm and presses the diaphragm to the valve seat side; and a piston that causes the diaphragm presser to move in an axial direction by a working fluid or pressing means pressing the diaphragm presser to the diaphragm side, and a stem that causes the piston to move in the axial direction by a manual operation, the hybrid valve having:

the piston having a piston body, a pressing shaft, and a working fluid introduction shaft, the piston body slidingly contacting an inner circumferential surface of a cylinder, and the pressing shaft extending both sides in the axial direction from the piston body;

a stepped cylindrical intermediate body that is fixed to the bonnet and is formed with an engagement cylindrical section on an opposite bonnet side, the engagement cylindrical section having a smaller diameter than a bonnet fixed side; and a rotary body that is formed with a working fluid introduction hole, through which the working fluid is introduced to a circumferential surface fitted to the engagement cylindrical section, in which the intermediate body is formed therein with a central through-hole, to which the working fluid introduction shaft is fitted, and a communication hole that connects an internal channel of the working fluid introduction shaft and the working fluid introduction hole.

In order to open/close the opening/closing valve 301 in FIG. 19 by the working fluid, the working fluid introduction hole 303*a* and a working fluid supply source have to be connected by a pipe. When the manual operation is not required, piping can easily be performed by providing a working fluid introduction hole in an upper portion. However, in a case of the hybrid valve, the working fluid introduction hole can only be provided to a circumferential surface of the body. There is no problem when a large space is available around the working fluid introduction hole 303*a* in FIG. 19. However, in many cases, such as a case where the integrated gas system is used, the opening/closing valve 301 is close to another valve or other fluid control equipment, and thus it is difficult to perform work to connect the pipe to the working fluid introduction hole 303*a*.

The invention (8) has been made in view of the above point, and can provide the hybrid valve that enables easy connection of the pipe even when there is a small space around the working fluid introduction hole, such as when the hybrid valve is used in the integrated gas system.

In the hybrid valve according to the invention (8), the working fluid introduction hole is formed in the rotary body that is fitted to the engagement cylindrical section of the intermediate body. Thus, the working fluid introduction hole can be arranged in any 360° position.

According to the hybrid valve in the invention (8), the working fluid introduction hole, which is connected to the working fluid supply source, can be arranged in any 360° position. Thus, it is possible to provide the hybrid valve that can be easily connect the pipe even when the hybrid valve is used in the integrated gas system.

In this case, the stem according to the invention (9) includes: a lower stem that is formed with a male screw on an outer circumferential surface, and one end of which presses the piston to the diaphragm side, the male screw being threaded to a female screw that is formed on an inner circumferential surface of the manual operation space; and an upper stem, one end portion of which is engaged with an engagement end portion formed at another end of the lower stem, and another end portion of which is projected from the manual operation space and is engaged with an operation handle, the operation handle includes an operation section and a cylindrical section that covers a tip of the engagement cylindrical section, an inner circumferential surface of the cylindrical section is formed with a projected guide that is engaged with a groove of a cylindrical indicator fixed to the engagement cylindrical section, the operation handle is constantly urged by urging means in a direction to cancel engagement between the operation handle and the upper stem, and the groove of the indicator can be formed with a circumferential groove and an axial groove in which the guide moves in an axial direction when the valve is in a fully closed or fully open state.

In the operation handle, the guide is rotated along the circumferential groove. When the valve is in the fully closed or fully open state, the guide is located in the axial groove, separates from the circumferential groove by the urging means, and inhibits the rotation of the operation handle. At this time, the axial groove has a top surface that inhibits movement of the guide at a position where the operation handle is not detached from the stem, so as to stop the movement of the guide.

Advantageous Effects of Invention

According to the valve in the invention, it is possible to provide the valve capable of suppressing unintended valve opening/closing by providing the play state during the manual operation without increasing the number of the components, enabling smooth transition from the play state to the rotation state, and effectively preventing deterioration caused by wear or the like since the engagement portion between the stem and the operation handle makes the surface contact.

DESCRIPTION OF EMBODIMENTS

Figure 1:
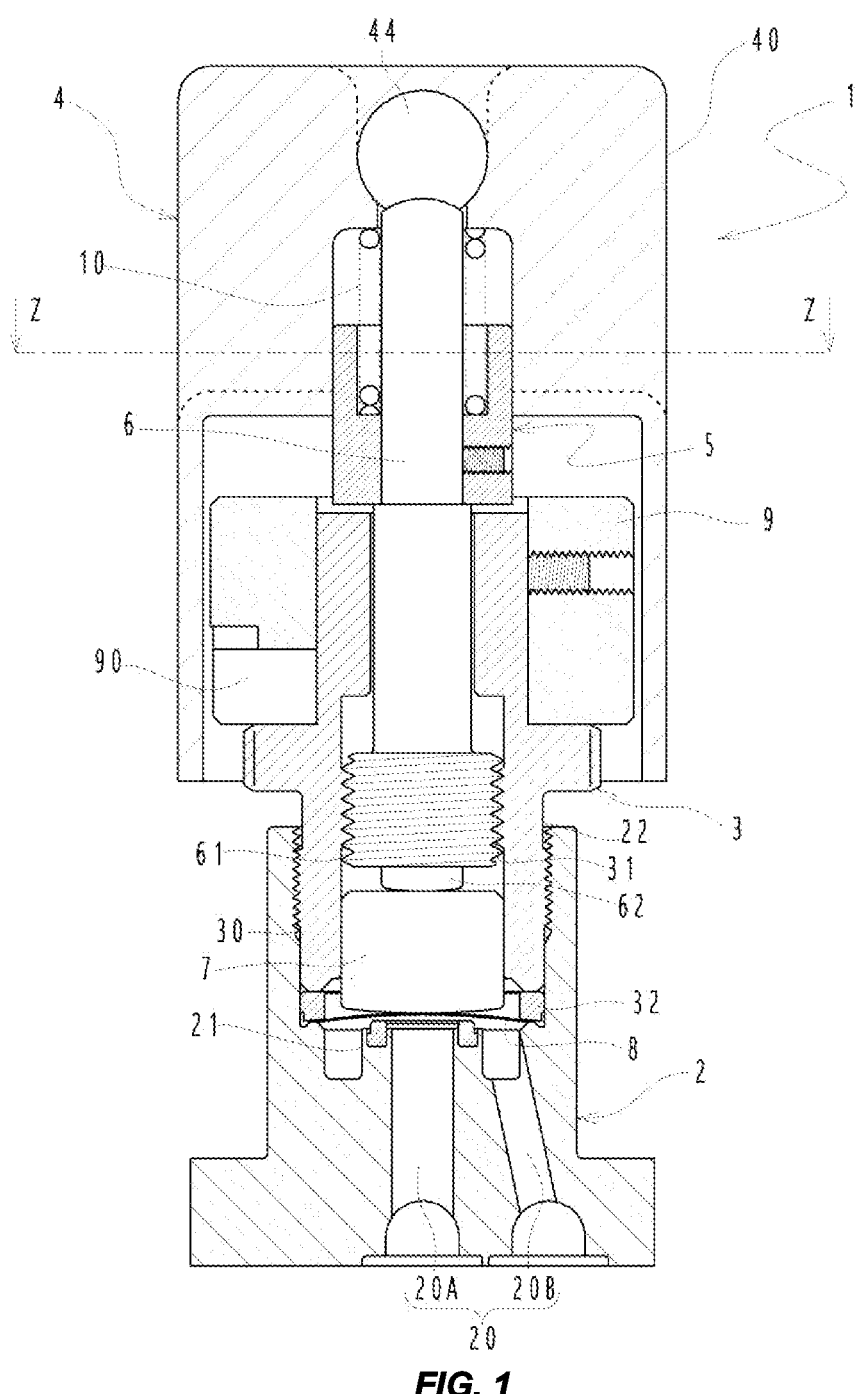
FIG. 1 is a front cross-sectional view in which a valve according to the invention is partially cut out.

A description will hereinafter be made on a preferred embodiment of the valve according to the invention with reference to the drawings. Unless otherwise specifically described, shapes, relative arrangement, and the like of components that are described in this embodiment are not intended to limit the scope of the invention but are merely illustrative examples. In some cases, for convenience, directions of members and the like are referred to as up, down, right, and left directions based on directions thereof in the drawings. However, these do not limit the scope of the invention.

First Embodiment

A first embodiment of the invention will be described. FIG. 1 is a front cross-sectional view in which a valve 1 according to the invention is partially cut out. The valve 1 in the invention is a valve including: a valve body 2 that is formed with a fluid channel 20 and a valve seat 21 therein, the fluid channel 20 including an inlet channel 20A and an outlet channel 20B, and the valve seat 21 being arranged at a circumferential edge of an inner open end of the inlet channel 20A; a diaphragm 8 that abuts/separates from a seat surface of the valve seat 21; a hollow bonnet 3 that fixes a circumferential edge of this diaphragm 8 to the valve body 2; a diaphragm presser 7 that abuts the diaphragm 8 and presses the diaphragm 8 to the valve seat 21 side; and a stem 6, one end portion of which is formed with a male screw 61 on an outer circumferential surface, and the other end portion of which is projected from the bonnet and is engaged with an engagement hole 42 formed in a central portion of an inner surface of an operation handle 4, the male screw 61 being threaded to a female screw 31 that is formed on an inner circumferential surface of the bonnet 3.

As described above, the other end portion of the stem 6 is projected from the bonnet and inserted in the engagement hole 42 of the operation handle 4, which will be described below. In addition, the stem 6 is urged to the valve body 2 side by urging means 10, such as a spring, provided on a top surface of the engagement hole 42. Furthermore, a tip of the other end portion of the stem 6, which is projected from the bonnet 3, and the engagement hole 42 of the operation handle 4 form a corresponding circumferential surface section and a planar section continuous to the circumferential surface section. In this first embodiment, a planar section 50 at the tip of the other end portion of the stem 6 abuts a planar section 42a of the engagement hole 42, and thereby transmits rotation of the operation handle 4 to the stem 6 (see FIG. 5).

One of the tip of the other end portion of the stem 6 and the planar section of the engagement hole 42 is formed to have two flat surfaces defining a predetermined angle, and is thereby formed to generate predetermined play when the operation handle 4 is rotated in one direction after being rotated in another direction.

Figure 6:
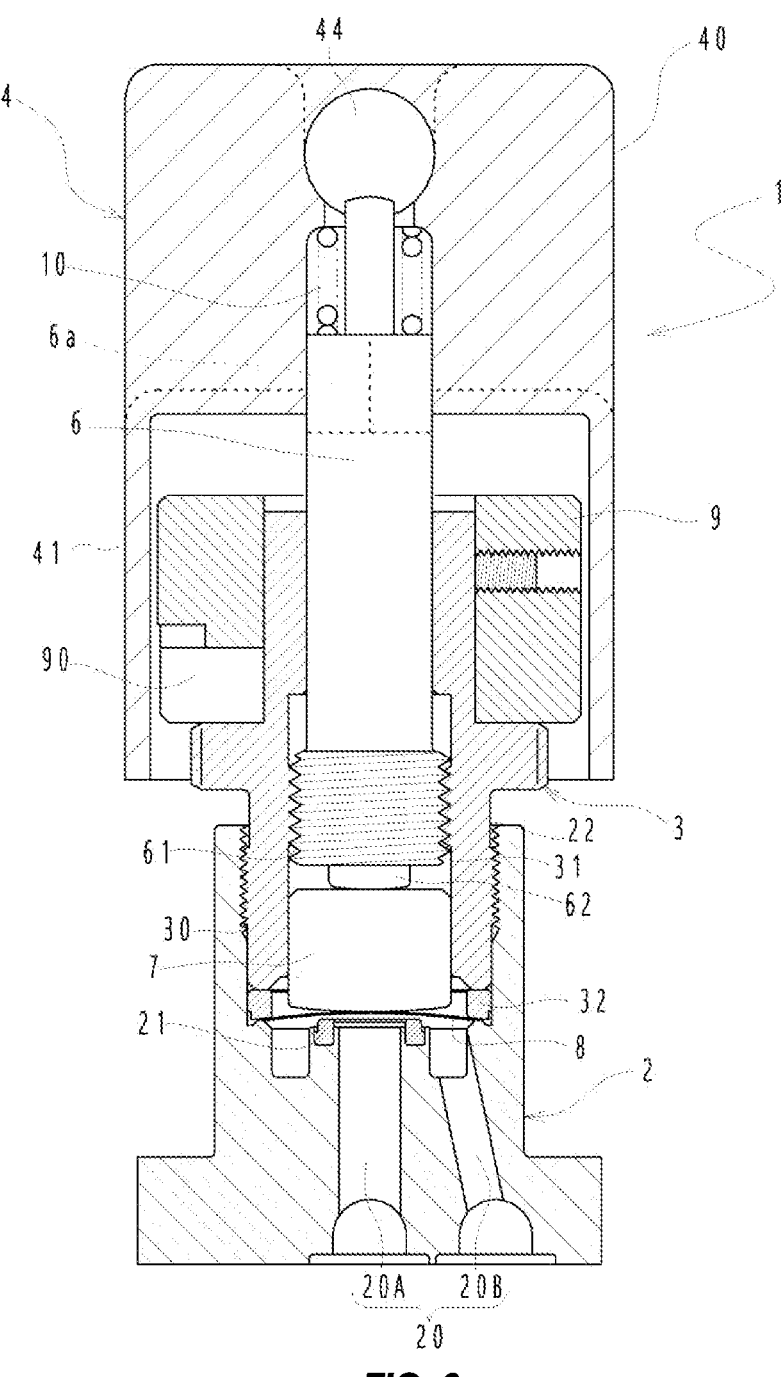
FIG. 6 is a front cross-sectional view in which another example of the valve according to the invention is partially cut out.

As illustrated in FIG. 6, the planar section at the tip of the other end portion of the stem 6 may directly be formed in the stem 6. However, in this first embodiment, as illustrated in FIG. 1, a cylindrical engagement member 5 illustrated in FIG. 3(c), (d) is inserted in the tip of the other end portion of the stem 6 and fixed thereto by a set screw. By using the engagement member 5, the operation handle 4 can be attached thereto while appropriately adjusting a rotational position thereof.

Figure 2A:
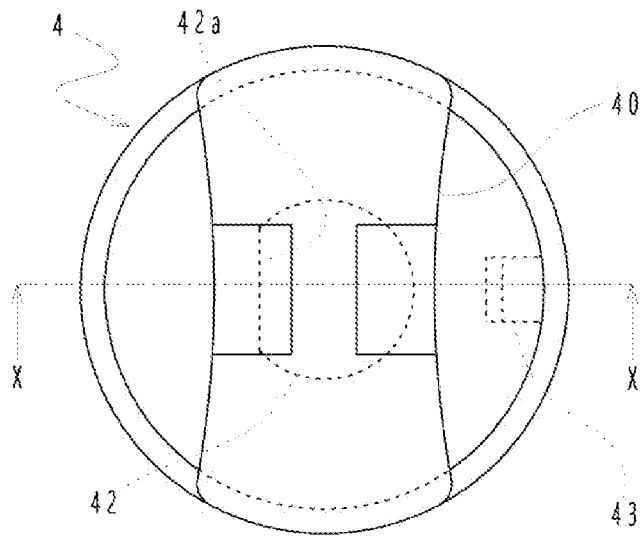
FIG. 2 illustrates an operation handle for the valve, in which (a) is a plan view, and (b) is a cross-sectional view taken along X-X in (a).
Figure 3A:
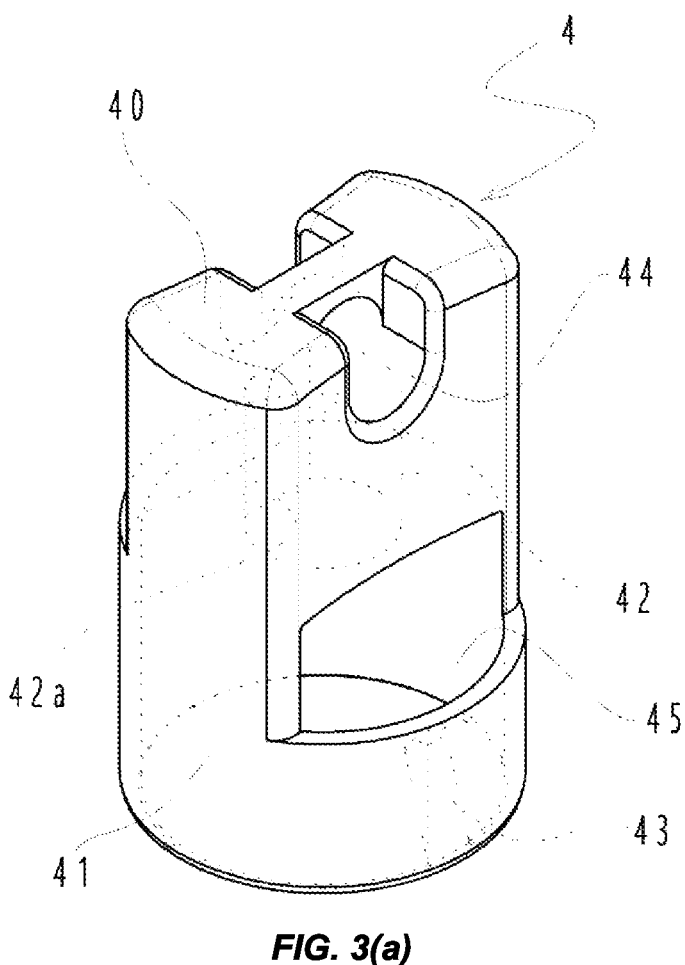
FIG. 3 illustrates components of the valve, in which (a) is a perspective view of the operation handle, (b) is a perspective view of an indicator that is fixed to a bonnet, (c) is a perspective view of an engagement member, and (d) is a perspective view of another example of the engagement member.
Figure 3B:
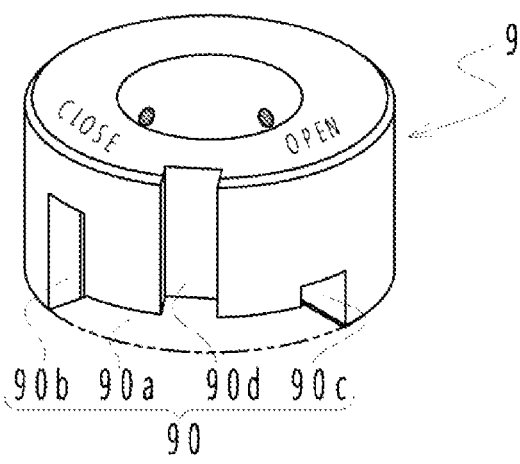
Figure 3C:
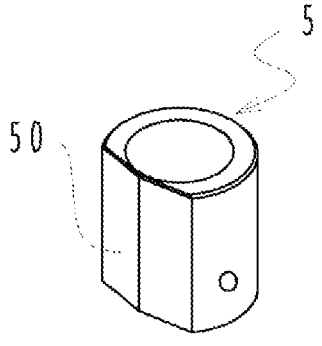
Figure 3D:
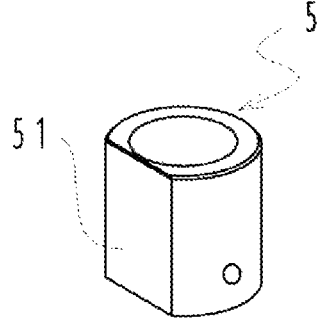

In this first embodiment, as illustrated in FIG. 3(c), the planar section 50 of the engagement member 5 is formed to have the two flat surfaces defining the predetermined angle, and is formed such that the planar section 50 and the planar section 42a of the engagement hole 42 illustrated in FIG. 2(a) abut each other when the operation handle 4 is rotated. In this way, the predetermined play is generated when the operation handle 4 is rotated in the one direction after being rotated in the other direction. The two flat surfaces in the planar section 50 of the engagement member 5 are preferably formed by chamfering the cylindrical engagement member 5 by 10° each, for example.

MODIFIED EXAMPLES

Figure 4A:
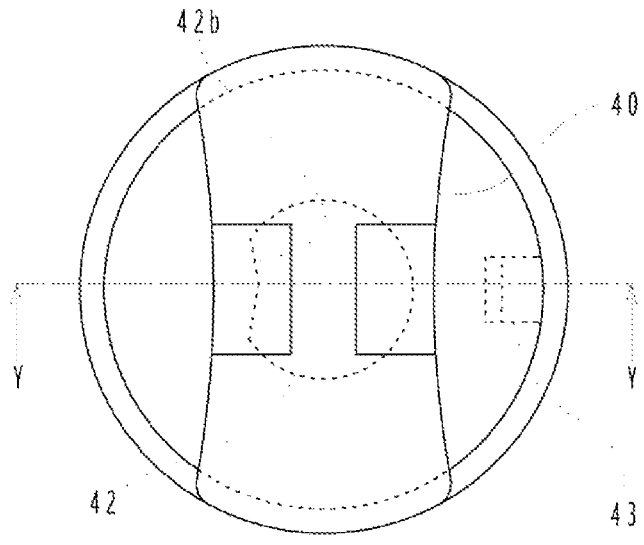
FIG. 4 illustrates another example of the operation handle for the valve, in which (a) is a plan view, and (b) is a cross-sectional view taken along Y-Y in (a).
Figure 4B:
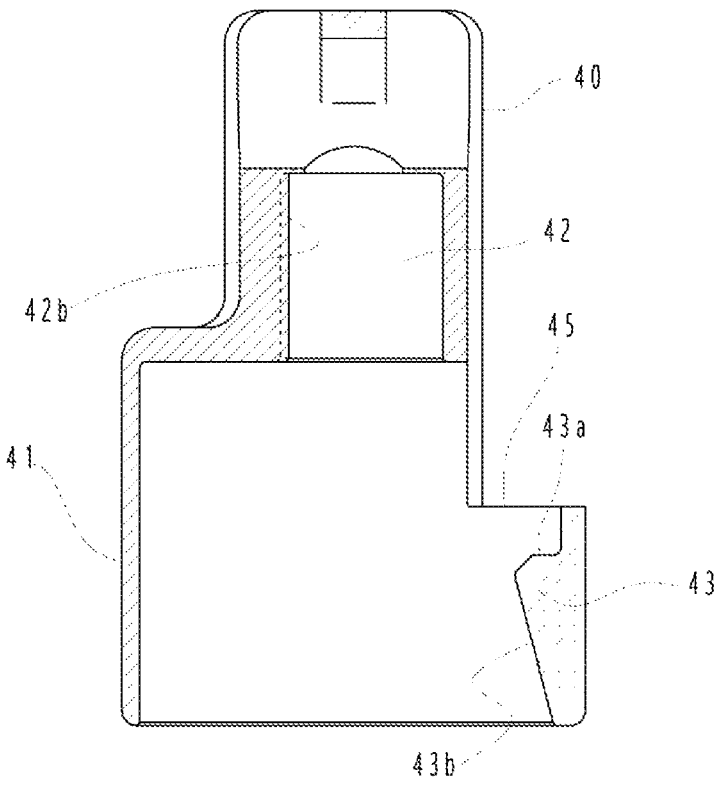

As a modified example of this first embodiment, as illustrated in FIG. 4(*a*), a planar section 42*b* of the engagement hole 42 can be formed to have the two flat surfaces defining the predetermined angle, and can be formed to abut a planar section 51 of the engagement member 5 illustrated in FIG. 3(*d*) when the operation handle 4 is rotated. With such a configuration, similar to the first embodiment, the predetermined play is generated when the operation handle 4 is rotated in the one direction after being rotated in the other direction.

As described above, since one of the tip (the engagement member 5) of the other end portion of the stem 6 and the planar section of the engagement hole 42 of the operation handle is formed to have the two flat surfaces defining the predetermined angle, the predetermined play is generated when the operation handle 4 is rotated in the one direction after being rotated in the other direction. Thus, it is possible to suppress unintended valve opening/closing and smoothly shift from a play state to a rotation state. In addition, since the engagement section between the stem 6 and the operation handle 4 makes a surface contact, it is possible to effectively prevent deterioration thereof, which is caused by wear or the like. Furthermore, with the configuration of the invention, effects of the purpose can be exerted without particularly increasing the number of components.

As described above, the stem 6 is formed with: the male screw 61, which is threaded to the female screw 31 formed on the inner circumferential surface of the bonnet 3, on the outer circumferential surface of the one end portion; and an abutment section 62 that abuts the diaphragm presser 7. When being rotated by the operation handle 4, the stem 6 moves in the up-down direction by a distance corresponding to a screw pitch. Consequently, the diaphragm presser 7 is pressed against the diaphragm 8, and the diaphragm 8 then abuts the valve seat 21 and can inhibit a flow of a fluid. Meanwhile, when the stem 6 moves upward, the diaphragm presser 7 no longer presses the diaphragm 8, and then the diaphragm 8 separates from the valve seat 21 by a self-restoring force of the diaphragm 8 and a fluid pressure in the inlet channel 20A and allows the flow of the fluid.

The valve body 2 is provided to an exemplary valve that is arranged in an accumulation system, and is exemplified that open ends of the inlet channel 20A and the outlet channel 20B are formed in a lower surface. However, it is needless to say that the valve body 2 is not limited thereto. Meanwhile, an upper surface side of the valve body 2 is formed with a recess in which the bonnet 3 is fixed, and an inner circumferential surface of the recess is formed with a female screw 22, to which a male screw 30 formed on an outer circumferential surface of the bonnet 3 is threaded.

In the hollow bonnet 3, the male screw 30 is formed on the outer circumferential surface on one end side, and is threaded to the female screw 22 that is formed on the inner circumferential surface of the recess of the valve body 2. Then, an outer circumferential edge of one end portion on this one end side presses an annular diaphragm fixture member 32 that abuts the circumferential edge of the diaphragm 8, and the diaphragm 8 is thereby fixed to the valve body 2. However, the diaphragm fixture member 32 may not be provided, and the end portion of the bonnet 3 may directly press and fix the diaphragm 8.

Meanwhile, an indicator 9 is fixed to the other end side of the bonnet 3. A circumferential surface of the indicator 9 is formed with a circumferential groove 90*a* and axial grooves 90*b*, 90*c*, each of which is used to guide a guide 43 of the operation handle 4, which will be described below. Letters [OPEN] and [CLOSE] are printed on a top surface of the indicator 9, and an opened/closed state of the valve 1 can visually be recognized through a window 45 of the operation handle 4. For this reason, the indicator 9 is configured to be freely rotatable with respect to the bonnet 3, be fixed at any position by a set screw, and correctly display the printed letters when the valve is opened/closed.

Figure 2B:
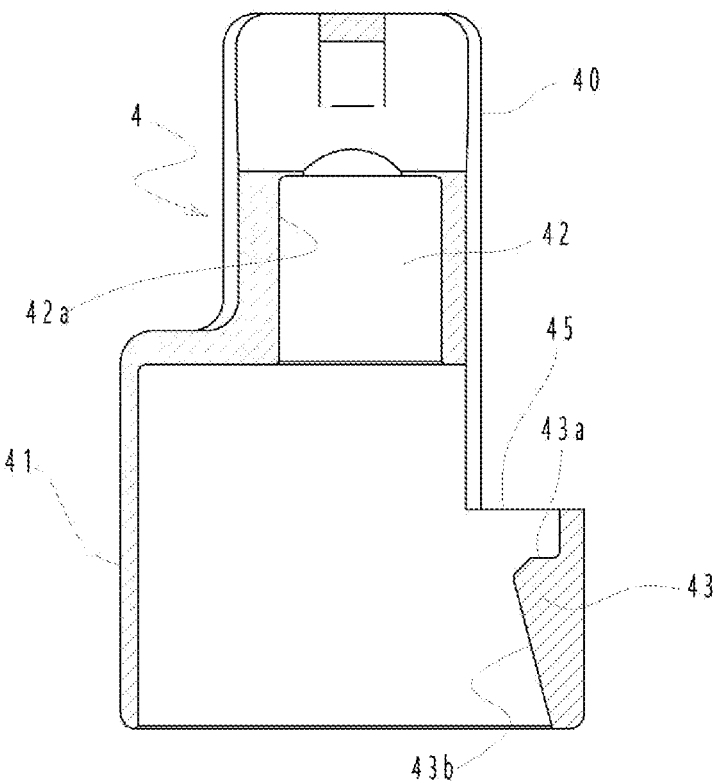

The operation handle 4 is made of a resin and includes: an operation section 40 in which the engagement section with the one end portion (the engagement member 5) of the stem 6 is formed; and a cylindrical section 41 that covers the bonnet 3. However, the operation handle 4 is not limited to that made of the resin. The operation section 40 is formed with a cylindrical insertion opening 44, through which a stopper is inserted. The engagement section on the inside is the engagement hole 42, in which the one end portion (the engagement member 5) of the stem 6 is inserted, and is partially formed with the engagement planar sections 42*a*, 42*b* that respectively correspond to the planar sections 50, 51 formed in the one columnar end portion (the engagement member 5) of the stem 6. An inner circumferential surface of the cylindrical section 41 is formed with the guide 43 in a projection shape that is engaged with a groove 90 of the cylindrical indicator 9 fixed to the bonnet 3. As illustrated in FIG. 2(*b*), an engagement surface 43*a*, which is projected inward, is formed in an upper portion of this guide 43, and an inner portion of the guide 43 is chamfered to form an inclined surface 43*b*, which is oriented downward.

The operation handle 4 is constantly urged in a direction to disengage the operation handle 4 from the stem 6 (the engagement member 5) by the urging means 10. However, since the guide 43 is engaged with an upper surface of the circumferential groove 90*a* or a top surface of the axial groove 90*b* in the groove 90, the operation handle 4 is not disengaged from the stem 6 (the engagement member 5). In addition, the window 45 is formed at an appropriate position of the operation handle 4 (a position above the guide 43 in this first embodiment), and is configured that the above-described letters printed on the top surface of the indicator 9 can visually be recognized from the outside.

As illustrated in FIG. 3(*b*), the groove 90 of the indicator 9 is formed with: the circumferential groove 90*a* on a lower end side of the indicator 9; and the axial grooves 90*b*, 90*c*, each of which extends toward an upper end side and is provided at each end of the circumferential groove 90*a*. As the axial grooves, in each of which the guide 43 moves in the axial direction in a fully closed or fully open state of the valve, the axial groove 90*b* at a fully-closed position and the axial groove 90*c* at a fully-open position are provided, and each thereof includes the top surface that restricts upward movement of the guide 43. This top surface is engaged with the engagement surface 43*a* of the guide 43 and functions as the stopper. An axial groove 90*d*, which is provided between the axial grooves 90*b*, 90*c* and does not have a top surface, is an axial groove, through which the guide 43 passes when the operation handle 4 is attached, and has a width that is less than the other axial grooves and is slightly greater than the guide 43. The axial groove 90*d* is also shallow in groove depth, and the operation handle is attached thereto while being elastically deformed. In this way, the axial groove 90*d* prevents falling of the operation handle 4 during a normal operation.

In the valve 1, the bonnet 3 is screwed and fixed to the valve body 2 in a state where the stem 6 in the engaged state and the diaphragm presser 7 are arranged in the bonnet 3 and where the diaphragm 8 and the diaphragm fixture member 32 are placed on the valve seat 21 of the valve body 2. At this time, the stem 6 is set in a state of being rotated 45° from the fully-closed position to a 45° open position. Thereafter, the rotational positions of the indicator 9 and the engagement member 5 are adjusted, the indicator 9 and the engagement member 5 are then attached to the bonnet 3 and the stem 6, and the urging means 10 is disposed. In such a state, the operation handle 4 is attached to the stem 6 (the engagement member 5) such that the planar sections 42*a*, 42*b* of the engagement hole 42 follow the planar sections 50, 51. In this way, the guide 43 of the operation handle 4 can be attached along the axial attachment groove 90*d* of the axial grooves in the indicator 9. When the guide 43 reaches the circumferential groove 90*a*, the operation handle 4 is rotated to the fully-closed or fully-open position. Then, assembly of the valve 1 is completed.

Next, a description will be made on rotational operation of the valve 1 in the invention.

In this first embodiment, a description will be made with reference to FIG. 5 (a1) to (a3). First, in the engagement section between the engagement member 5, which is attached to the tip of the other end portion of the stem 6, and the operation handle 4, the rotational operation is started from a position in FIG. 5 (a1) (the valve fully-closed state). While the operation handle 4 is pushed in against the urging means 10 and is rotated 10° counterclockwise from FIG. 5 (a1) to FIG. 5 (a2), a force in a rotational direction is not applied to the engagement member 5, thus the engagement member 5 is not rotated, and the engagement member 5 and the stem 6 do not move in the up-down direction. With this play, even in the case where the guide 43 is detached from the axial grooves 90*b*, 90*c*, and the operation handle 4 is slightly rotated due to hitting of a worker's body against the operation handle 4 or generation of vibration when opening/closing work is not performed, the engagement member 5 and the stem 6 are not rotated, a positional relationship between the diaphragm 8 and the valve seat 21 is not changed, and the fluid does not flow or is not blocked unexpectedly.

Figure 5:
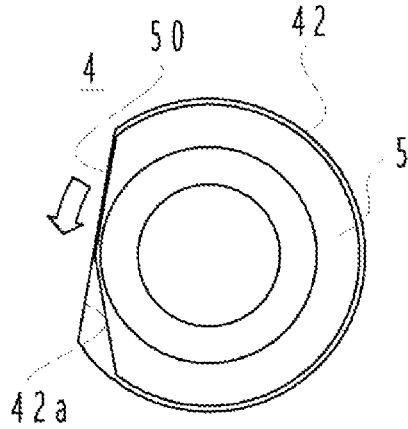
FIG. 5 illustrates an engagement state between the engagement member in FIG. 3(*c*) and the operation handle in FIG. 2 from (a1) to (a3), and illustrates the engagement state between the engagement member in FIG. 3(*d*) and the operation handle in FIG. 4 from (b1) to (b3), in which (a1) and (b1) each illustrate an abutment state between a planar section of the engagement member and a planar section of the operation handle before rotation of the operation handle, (a2) and (b2) each illustrate a state where the operation handle starts rotated for 10°, and (a3) and (b3) are cross-sectional views, each of which is taken along Z-Z in FIG. 1 and illustrates a state where the operation handle is further rotated for 90°.
Figure 5:
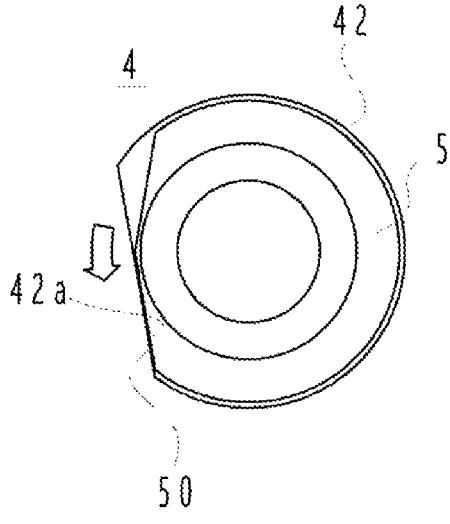
Figure 5:
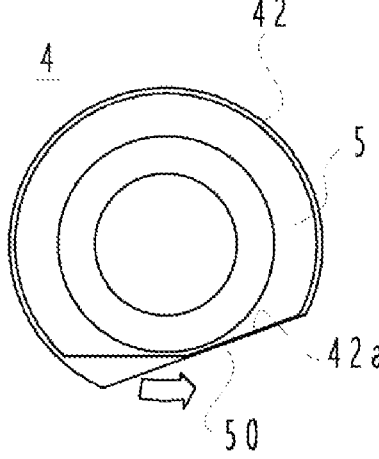
Figure 5:
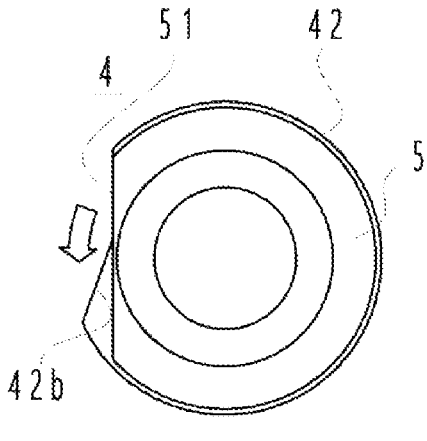
Figure 5:
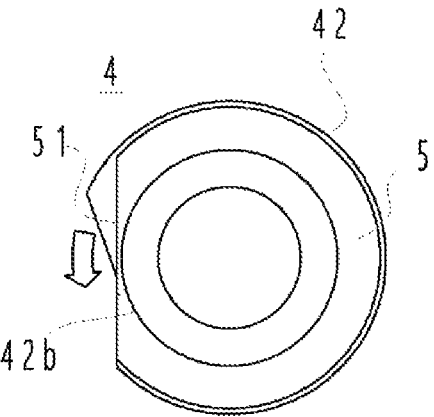
Figure 5:
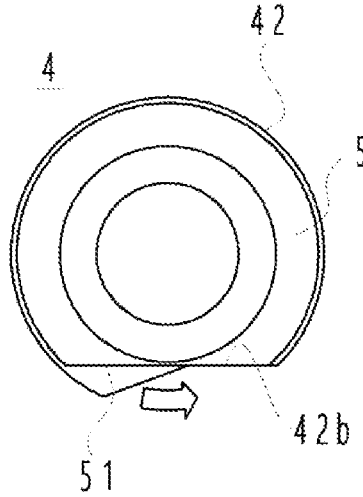

Next, in the state of FIG. 5 (a2), the planar section 42*a* of the engagement hole 42 in the operation handle abuts the planar section 50 (one of the two flat surfaces) of the engagement member 5. When the operation handle 4 is further rotated 90° counterclockwise from FIG. 5 (a2) to FIG. 5 (a3), the engagement thereof with the engagement member 5 becomes the engagement achieved by the surface contact, and a reaction force that the planar section 50 of the engagement member 5 receives from the planar section 42*a* of the engagement hole 42 is dispersed over the surface and thus becomes smaller than that in a case of a linear contact. Thus, the operation by the operation handle 4 is smooth, and the worker does not sense the play of the rotation.

In addition, when the operation handle 4 is further rotated 90° counterclockwise from FIG. 5 (a2) to FIG. 5 (a3), the engagement member 5 and the stem 6 are also rotated 90°. Consequently, the male screw 61, which is threaded to the female screw 31 of the bonnet 3, in the stem 6 moves upward by a pitch of the rotation for 90°, the abutment section 62 separates from the diaphragm presser 7, and the diaphragm 8 is brought into the fully open state where the diaphragm 8 separates from the valve seat 21 by the self-restoring force of the diaphragm 8 and the fluid pressure in the inlet channel 20A.

Second Embodiment

Figure 7:
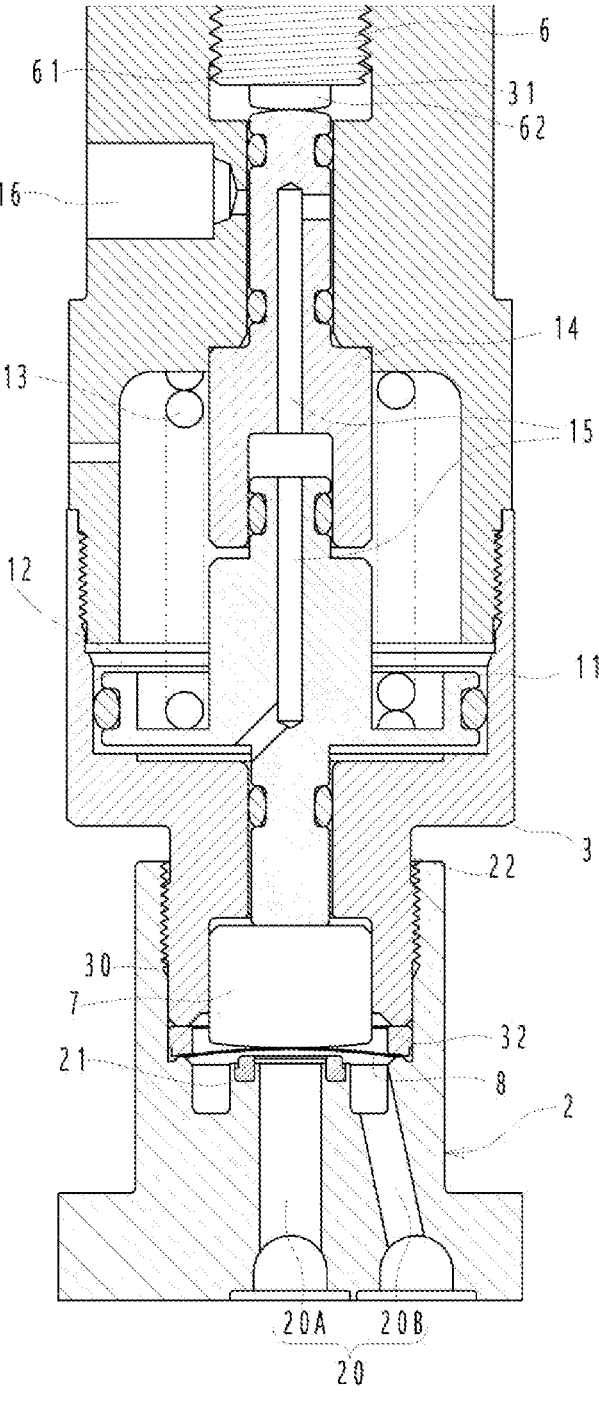
FIG. 7 is a front cross-sectional view in which another example of the valve according to this second embodiment is partially cut out.

FIG. 7 illustrates a second embodiment of the invention. The second embodiment of the invention is a so-called hybrid valve that can be actuated automatically and manually. In the hybrid valve, a piston 11 and a cylinder 12 that move in the axial direction by a working fluid such as air are arranged between the diaphragm presser 7 and the stem 6.

In the hybrid valves, the pistons 11 are usually divided into: a normally closed type that presses the diaphragm presser 7 by pressing means 13 such as the spring; and a normally open type that cancels pressing of the diaphragm presser 7 by the pressing means 13 such as the spring. The working fluid flows onto an opposite surface of the piston 11 from a surface thereof that is loaded by the pressing means 13. In a case of the normally closed type, the hybrid valve is opened by the inflow of the working fluid. In a case of the normally open type, the hybrid valve is closed by the inflow of the working fluid. The working fluid is supplied from a working fluid inflow hole 16 via an internal channel 15 in an intermediate stem 14 and the piston 11. The illustrated valve is the hybrid valve of the normally closed type.

The hybrid valve can be opened/closed manually when the working fluid does not stop flowing for some reason, or when the working fluid does not flow for some reason during the actuation thereof. However, as described above, in the case where there is no play between the stem and the operation handle, the fluid is possibly stopped unexpectedly when the worker hits the operation handle, or the like.

Thus, similar to the first embodiment, the hybrid valve as the second embodiment of the invention is also provided with the play in the engagement section between the stem and the operation handle, so as to solve the above-described problem.

Third Embodiment

Figure 8:
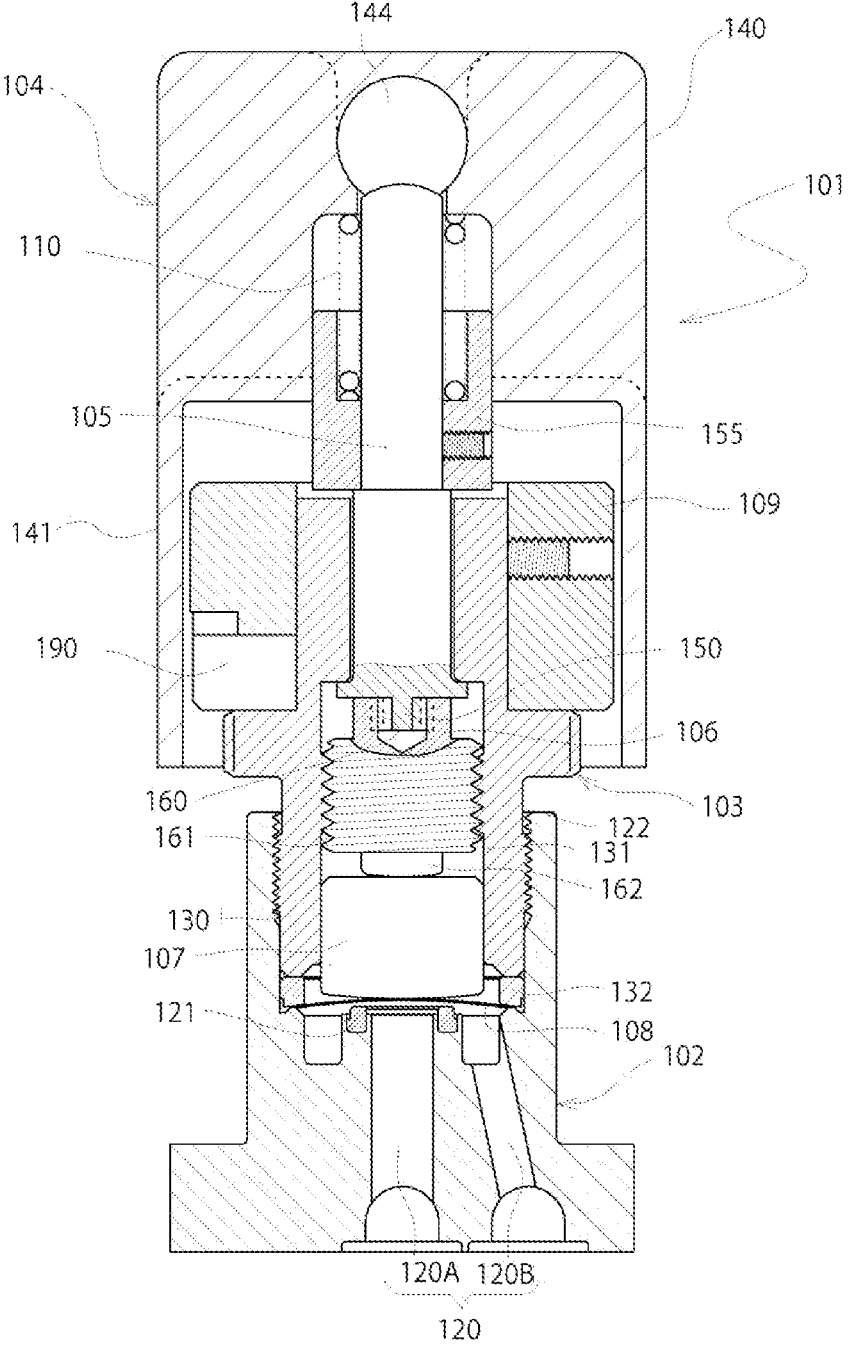
FIG. 8 is a front cross-sectional view in which the valve according to the invention is partially cut out.

FIGS. 8 to 11 illustrate a third embodiment of the invention. FIG. 8 is a front cross-sectional view in which a valve 101 according to the invention is partially cut out. The valve 101 in the invention is a valve including: a valve body 102 that is formed with a fluid channel 120 and a valve seat 121 therein, the fluid channel 120 including an inlet channel 120A and an outlet channel 120B, and the valve seat 121 being arranged at a circumferential edge of an inner open end of the inlet channel 120A; a diaphragm 108 that abuts/separates from a seat surface of the valve seat 121; a hollow bonnet 103 that fixes a circumferential edge of this diaphragm 108 to the valve body 102; a diaphragm presser 107 that abuts the diaphragm 108 and presses the diaphragm 108 to the valve seat 121 side; a lower stem 106 that is formed with male screw 161 on an outer circumferential surface, the male screw 161 being threaded to a female screw 131 that is formed on an inner circumferential surface of the bonnet 103; and an upper stem 105, one end portion of which is engaged with the lower stem 106, and the other end portion of which is projected from the bonnet 103 and is engaged with an operation handle 104.

In an engagement section between the upper stem 105 and the lower stem 106, either one of end surfaces, in this embodiment, that of the lower stem 106 is formed with a pair of fan-shaped abutment sections 160, 160 having circular arcs while the other end surface, in this embodiment, that of the upper stem 105 is formed with a projected section 150. The projected section 150 has: a pair of substantially fan-shaped missing sections 150b, 150b, each of which has a longer arc length than the circular arc of the fan-shaped abutment section 160; and vertical surfaces 150a, 150a that make the surface contact with planar lateral surfaces 160a, 160a of the fan-shaped abutment section 160. In the case where both of the fan-shaped abutment section 160 and the projected section 150 have the fan shape as illustrated in FIG. 11(b), a predetermined clearance has to be provided in a central portion of one of those, so as to allow passing by the other. In the fan-shaped abutment section 160 having the circular arc, an arcuate surface 160b is also preferably provided on a center side (see FIG. 11 (a1)). A difference between the arc length of the missing section 150b and the arc length of the fan-shaped abutment section 160 serves as the play and is set for 20° in this embodiment.

Figure 12:
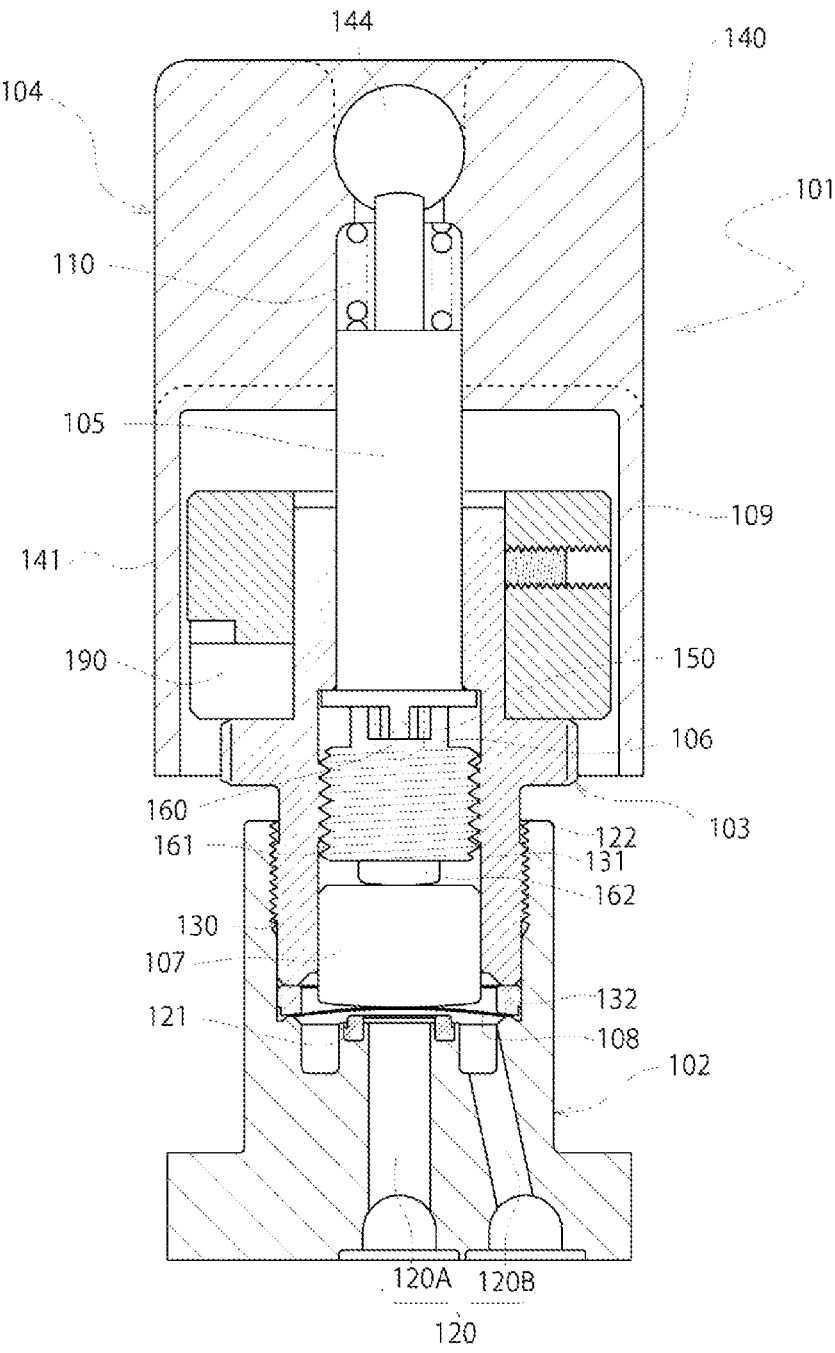
FIG. 12 is a front cross-sectional view in which another example of the valve according to the invention is partially cut out.

As described above, the one end of the upper stem 105 is formed with the projected section 150 that is engaged with the lower stem 106, and the other end thereof is inserted in a hole 142 of the operation handle 104, which will be described below. In addition, the upper stem 105 is urged to the lower stem 106 side by the urging means, such as the spring, provided on a top surface of the hole 142. In addition, the upper stem 105 is formed with a planar section that abuts a planar section 142a of this hole 142, and rotation of the operation handle 104 is thereby transmitted to the upper stem 105. As illustrated in FIG. 12, this planar section may directly be formed in the upper stem 105. However, as illustrated in FIG. 8, a cylindrical engagement piece 155 illustrated in FIG. 10(c) may be inserted in the stem 105 and fixed thereto by a set screw. By using the engagement piece 155, the operation handle 104 can be attached thereto while appropriately adjusting the rotational position thereof.

As described above, the one end of the lower stem 106 is formed with the fan-shaped abutment section 160 that is engaged with the upper stem 105, and the other end thereof is formed with an abutment section 162 that abuts the diaphragm presser 107. In addition, a circumferential surface of the lower stem 106 is formed with the male screw 161 that is threaded to the female screw 131 formed on an inner surface of the bonnet 103. Thus, when being rotated by the operation handle 104, the upper stem 105 moves in the up-down direction by a distance corresponding to the screw pitch. Consequently, the diaphragm presser 107 is pressed against the diaphragm 108, and the diaphragm 108 then abuts the valve seat 121 and can inhibit the flow of the fluid. Meanwhile, when the lower stem 106 moves upward, the diaphragm presser 107 no longer presses the diaphragm 8, and then the diaphragm 108 separates from the valve seat 121 by a self-restoring force of the diaphragm 108 and the fluid pressure in the inlet channel 120A and allows the flow of the fluid.

The valve body 102 is provided to an exemplary valve that is arranged in the accumulation system, and is exemplified that open ends of the inlet channel 120A and the outlet channel 120B are formed in a lower surface. However, it is needless to say that the valve body 102 is not limited thereto. Meanwhile, an upper surface side of the valve body 102 is formed with a recess in which the bonnet 103 is fixed, and an inner circumferential surface of the recess is formed with a female screw 122, to which a male screw 130 formed on an outer circumferential surface of the bonnet 103 is threaded.

In the hollow bonnet 103, the male screw 130 is formed on the outer circumferential surface on one end side, and is threaded to the female screw 122 that is formed on the inner circumferential surface of the recess of the valve body 102. Then, an outer circumferential edge of one end portion on this one end side presses an annular diaphragm fixture member 132 that abuts the circumferential edge of the diaphragm 108, and the diaphragm 108 is thereby fixed to the valve body 102. However, the diaphragm fixture member 132 may not be provided, and an end portion of the bonnet 103 may directly press and fix the diaphragm 108.

Meanwhile, an indicator 109 is fixed to the other end side of the bonnet 103. A circumferential surface of the indicator 109 is formed with a circumferential groove 190a and axial grooves 190b, 190c, each of which is used to guide a guide 143 of the operation handle 104, which will be described below. The letters [OPEN] and [CLOSE] are printed on a top surface of the indicator 109, and an opened/closed state of the valve 101 can visually be recognized through a window 145 of the operation handle 104. For this reason, the indicator 109 is configured to be freely rotatable with respect to the bonnet 103, be fixed at a set position by a set screw, and correctly display the printed letters when the valve is opened/closed.

Figure 9A:
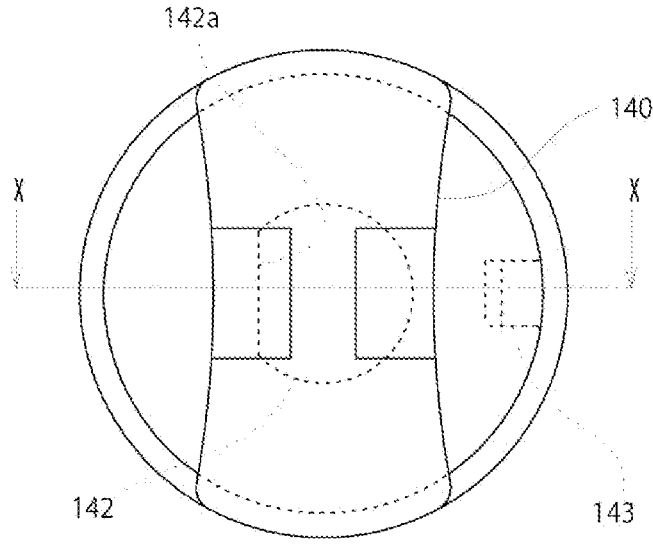
FIG. 9 illustrates the operation handle for the valve, in which (a) is a plan view, and (b) is a cross-sectional view taken along X-X in (a).
Figure 9B:
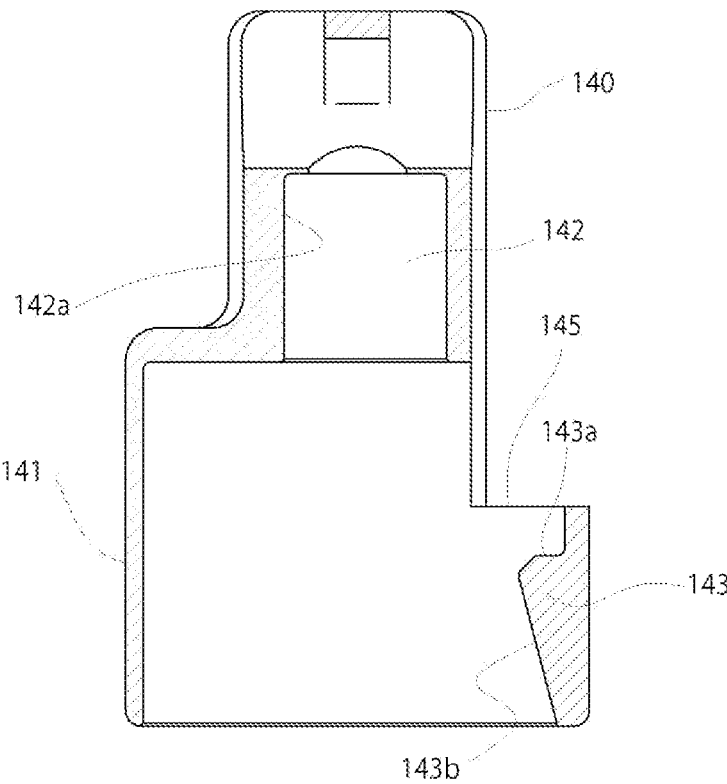

The operation handle 104 is made of the resin and includes: an operation section 140 in which the engagement section with the upper stem 105 is formed; and a cylindrical section 141 that covers the bonnet 103. However, the operation handle 104 is not limited to that made of the resin. The operation 140 is formed with a cylindrical insertion opening 144, through which the stopper is inserted. The engagement section on the inside is the engagement hole 142, in which the one end portion of the upper stem 105 is inserted, and is partially formed with the engagement planar section 142a that corresponds to the planar section formed in the one columnar end portion of the upper stem 105. An inner circumferential surface of the cylindrical section 141 is formed with the guide 143 in a projection shape that is engaged with a groove 190 of the cylindrical indicator 109 fixed to the bonnet 103. As illustrated in FIG. 9(b), an engagement surface 143a, which is projected inward, is formed in an upper portion of this guide 143, and an inner portion of the guide 143 is chamfered to form an inclined surface 143b, which is oriented downward.

The operation handle 104 is constantly urged in a direction to disengage the operation handle 104 from the upper stem 105 by urging means 110. However, since the guide 143 is engaged with an upper surface of the circumferential groove 190a or a top surface of the axial groove 190b in the groove 190, the operation handle 104 is not disengaged from the upper stem 105. In addition, the window 145 is formed at an appropriate position of the operation handle 104 (a position above the guide 143 in this embodiment), and is configured that the above-described letters printed on the top surface of the indicator 109 can visually be recognized from the outside.

Figure 10A:
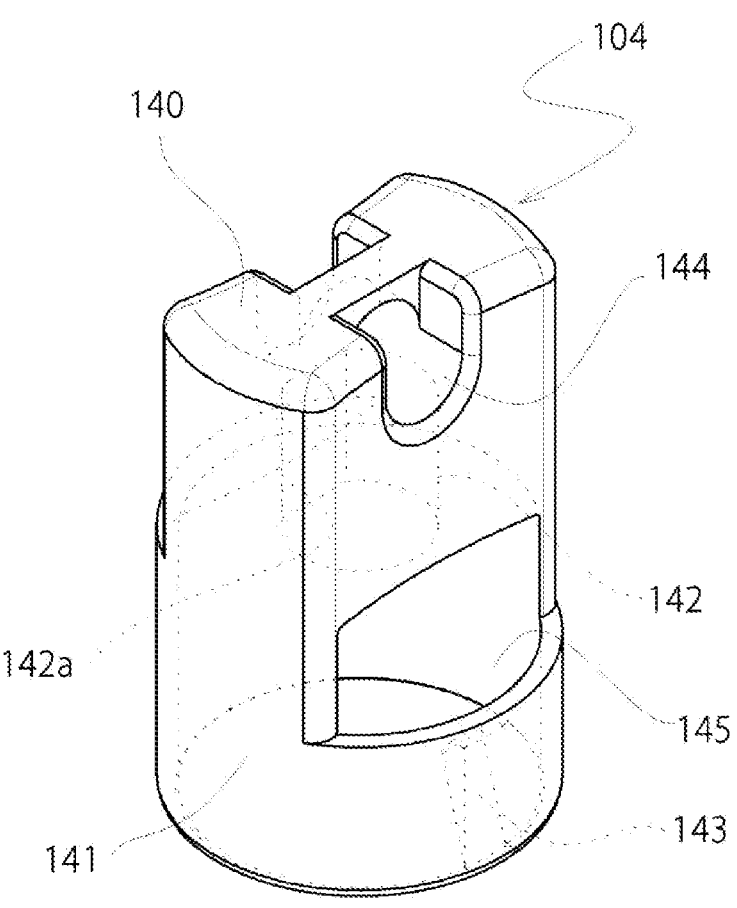
FIG. 10 illustrates components of the valve, in which (a) is a perspective view of the operation handle, (b) is a perspective view of the indicator that is fixed to the bonnet, and (c) is a perspective view of a handle engagement member.
Figure 10B:
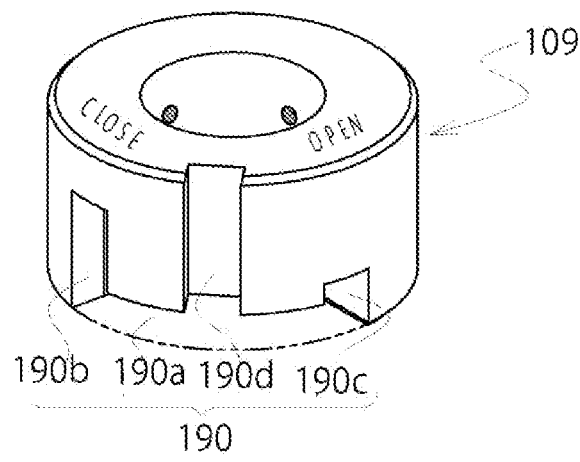
Figure 10C:
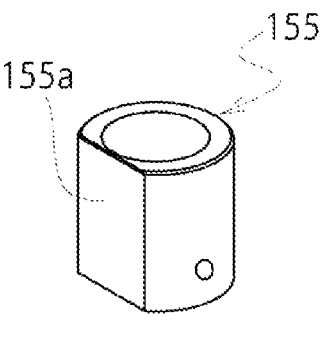

As illustrated in FIG. 10(b), the groove 190 of the indicator 109 is formed with: the circumferential groove 190a on a lower end side of the indicator 109; and the axial grooves 190b, 190c, each of which extends toward an upper end side and is provided at each end of the circumferential groove 190a. As the axial grooves, in each of which the guide 143 moves in the axial direction in the fully closed or fully open state of the valve, the axial groove 190b at the fully-closed position and the axial groove 190c at the fully-open position are provided, and each thereof includes the top surface that restricts upward movement of the guide 143. This top surface is engaged with the engagement surface 143a of the guide 143 and functions as the stopper. An axial groove 190d, which is provided between the axial grooves 190*b*, 190*c* and does not have a top surface, is an axial groove, through which the guide 143 passes when the operation handle 104 is attached, and has a width that is less than the other axial grooves and is slightly greater than the width of the guide 143. The axial groove 190*d* is also shallow in groove depth, and the operation handle is attached thereto while being elastically deformed. In this way, the axial groove 190*d* prevents falling of the operation handle 104 during the normal operation.

In the valve 101, the bonnet 103 is screwed and fixed to the valve body 102 in a state where the upper stem 105 in the engaged state, the lower stem 106, and the diaphragm presser 107 are arranged in the bonnet 103 and where the diaphragm 108 and the diaphragm fixture member 132 are placed on the valve seat 121 of the valve body 102. At this time, the stem is set in a state of being rotated from the fully-closed position to the 45° open position. Thereafter, the rotational positions of the indicator 109 and the engagement piece 155 are adjusted, the indicator 109 and the engagement piece 155 are then attached to the bonnet 103 and the upper stem 105, and the urging means 110 is disposed. In such a state, the operation handle 104 is attached to the upper stem 5 such that the planar section 142*a* of the hole 142 follows the planar section (a planar section 155*a* of the engagement piece 155). In this way, the guide 143 of the operation handle 104 can be attached along the axial attachment groove 190*d* of the axial grooves in the indicator 109. When the guide 143 reaches the circumferential groove 190*a*, the operation handle 104 is rotated to the fully-closed or fully-open position. Then, assembly of the valve 101 is completed.

Next, a description will be made on rotational operation of the valve 101 in the invention.

Figure 11:
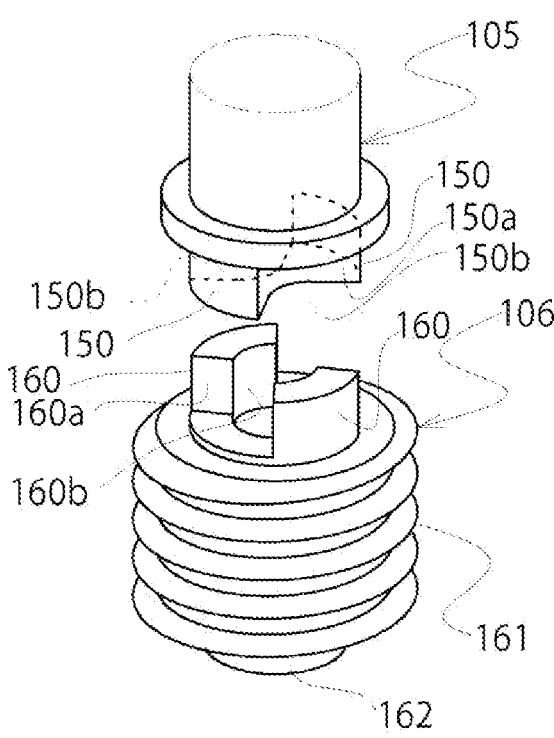
FIG. 11 illustrates an engagement section of a stem in the valve, in which (a1) is a perspective view of a state before engagement that is partially cut out, (a2) is a perspective view of an engagement state that is partially cut out, (b) is a perspective view of a state before engagement in another example that is partially cut out, (c1) is a plan view of the engagement section in a state before an upper stem (the operation handle) is rotated, (c2) is a plan view of the engagement section in a state where rotation is started and a vertical surface of a projected section abuts a planar lateral surface of a fan-shaped abutment section, and (c3) is a plan view of the engagement section in a state of being further rotated 90°.
Figure 11:
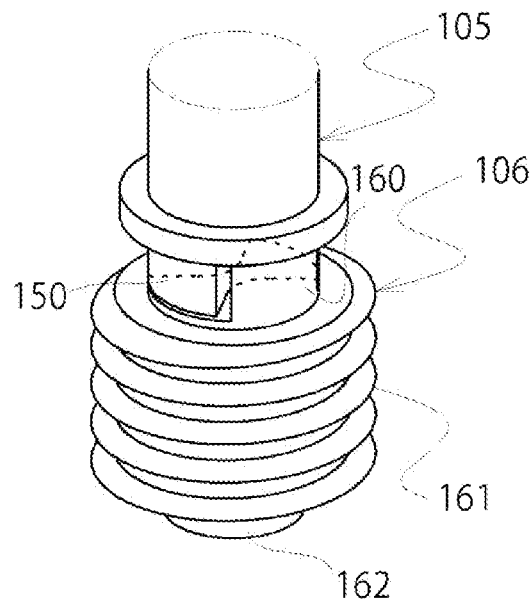
Figure 11B:
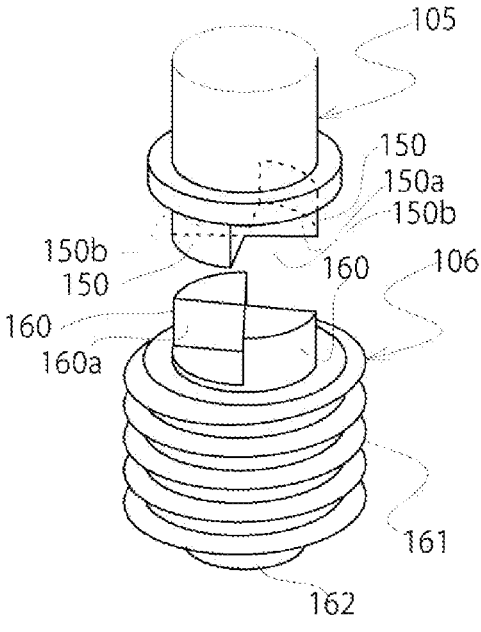

First, in the engagement section between the upper stem 105 and the lower stem 106, the rotational operation is started from a position at which the operation handle 104 is rotated 10° clockwise from a position in FIG. 11 (c1) (the valve fully-closed state). While the operation handle 104 is pushed in against the urging means 110 and is rotated 10° (20° from the initial state) counterclockwise from FIG. 11 (c1), the upper stem 105 is rotated in conjunction with the operation handle 104. However, the force in the rotational direction is not applied to the lower stem 106, thus the lower stem 106 is not rotated and does not move in the up-down direction. With this play, even in the case where the guide 143 is detached from the axial grooves 190*b*, 190*c*, and the operation handle 104 is slightly rotated due to hitting of the worker's body against the operation handle 104 or the generation of the vibration when the opening/closing work is not performed, the lower stem 106 is not rotated, a positional relationship between the diaphragm 108 and the valve seat 121 is not changed, and the fluid does not flow or is not blocked unexpectedly.

Next, in the state in FIG. 11 (c2), the vertical surface 150*a* of the projected section 150 in the upper stem 105 abuts the planar lateral surface 160*a* of the fan-shaped abutment section 160 in the lower stem 106. At this time, the engagement between the upper stem 105 and the lower stem 106 becomes the engagement achieved by the surface contact. Thus, when the operation handle 104 is rotated counterclockwise from the state in FIG. 11 (c2), the reaction force that the vertical surface 150*a* receives from the planar lateral surface 160*a* is dispersed over the surface and thus becomes smaller than that in a case of a linear contact. Thus, the operation by the operation handle 104 is smooth, and the worker does not sense the play of the rotation.

Then, when the operation handle 104 is rotated 90° counterclockwise from the state in FIG. 11 (c2), the lower stem 106 is also rotated 90°. Consequently, the male screw 161, which is threaded to the female screw 131 of the bonnet 103, in the lower stem 106 moves upward by a pitch of the rotation for 90°, the abutment section 162 separates from the diaphragm presser 107, and the diaphragm 108 is brought into the fully open state where the diaphragm 108 separates from the valve seat 121 by the self-restoring force of the diaphragm 108 and the fluid pressure in the inlet channel 120A.

Fourth Embodiment

Figure 13:
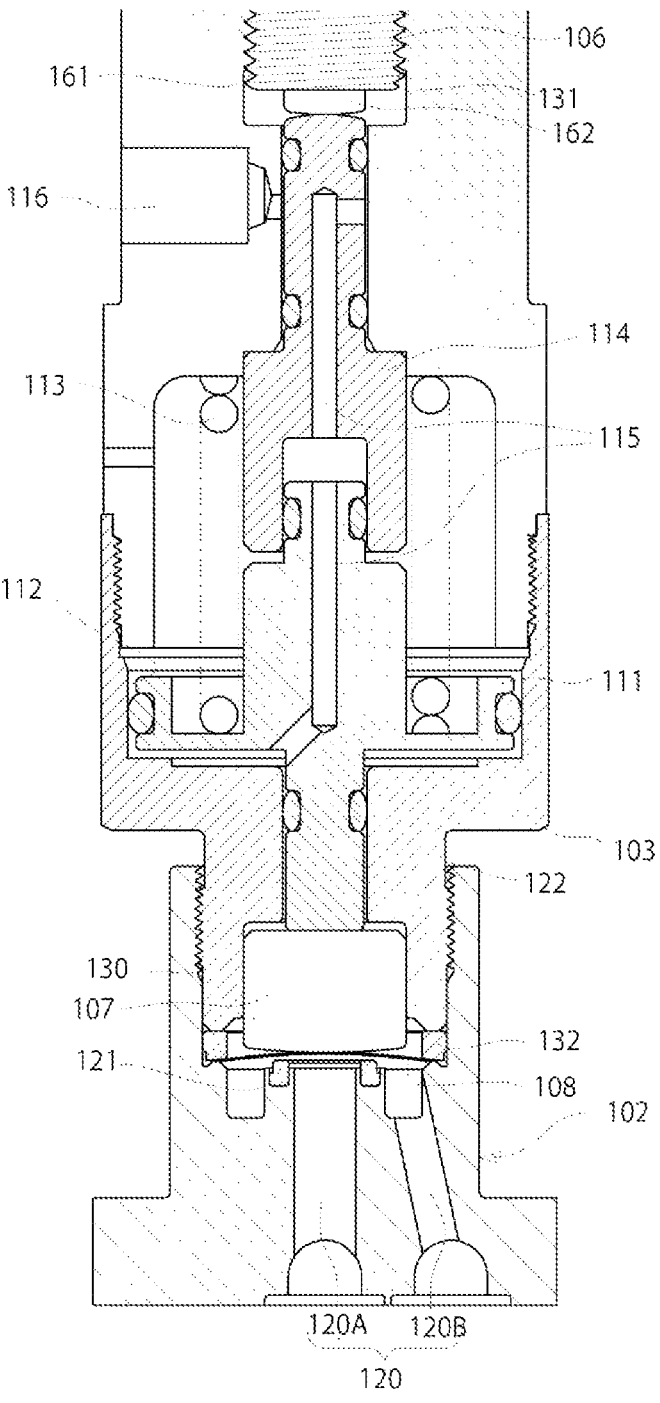
FIG. 13 is a front cross-sectional view in which another example of the valve according to the second invention is partially cut out.

FIG. 13 illustrates a fourth embodiment of the invention. The fourth embodiment of the invention is a so-called hybrid valve in which a piston 111 and a cylinder 112 that move in the axial direction by the working fluid such as the air are arranged between the diaphragm presser 107 and the lower stem 106.

In the hybrid valves, the pistons 111 are usually divided into: the normally closed type that presses the diaphragm presser 107 by pressing means 113 such as the spring; and the normally open type that cancels pressing of the diaphragm presser by the pressing means such as the spring. The working fluid flows onto an opposite surface of the piston 111 from a surface thereof that is loaded by the pressing means. In a case of the normally closed type, the hybrid valve is opened by the inflow of the working fluid. In a case of the normally open type, the hybrid valve is closed by the inflow of the working fluid. The working fluid is supplied from a working fluid inflow hole 116 via an internal channel 115 in an intermediate stem 114 and the piston 111. The illustrated valve is the hybrid valve of the normally closed type.

The hybrid valve can be closed manually when the working fluid does not stop flowing for some reason in the normally closed type thereof, or when the working fluid does not flow for some reason in the normally open type thereof. However, as described above, in the case where there is no play in the engagement section between the upper stem and the lower stem, the fluid is possibly stopped unexpectedly when the worker hits the operation handle, or the like.

Thus, the hybrid valve as the fourth embodiment of the invention is also provided with the above-described stopper function and the play in the stem engagement section, so as to solve the above-described problem.

Fifth Embodiment

Figure 14:
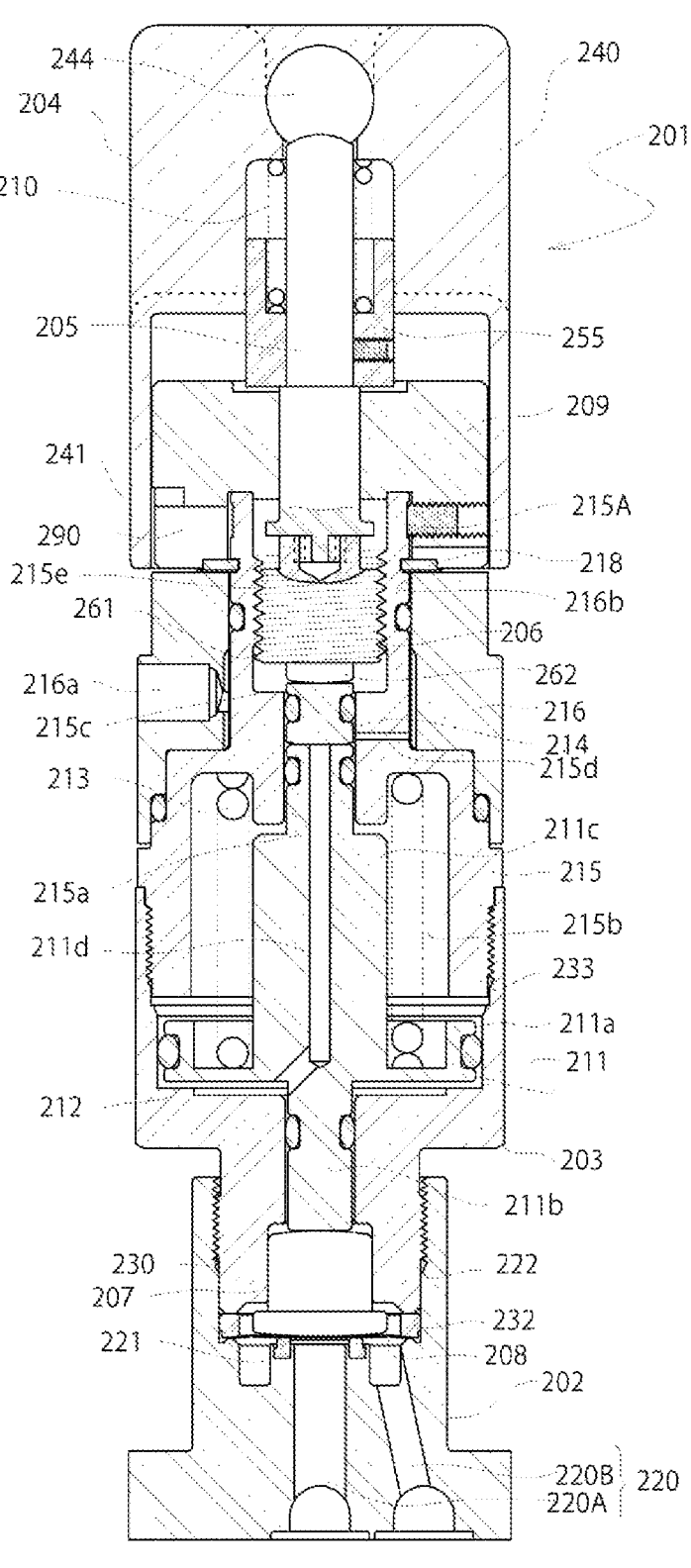
FIG. 14 is a front cross-sectional view in which a hybrid valve according to the invention is partially cut out.

FIGS. 14 to 17 illustrate a fifth embodiment of the invention. FIG. 14 is a front cross-sectional view in which a hybrid valve 201 according to the invention is partially cut out. The hybrid valve 201 in the invention is a hybrid valve including: a valve body 202 that is formed with a fluid channel 220 and a valve seat 221 therein, the fluid channel 220 including an inlet channel 220A and an outlet channel 220B, and the valve seat 221 being arranged at a circumferential edge of an inner open end of the inlet channel 220A; a diaphragm 208 that abuts/separates from a seat surface of the valve seat 221; a hollow bonnet 203 that fixes a circumferential edge of this diaphragm 208 to the valve body 202; a diaphragm presser 207 that abuts the diaphragm 208 and presses the diaphragm 208 to the valve seat 221 side; and a piston 211, an upper stem 205, and a lower stem 206, the piston 211 moving in the axial direction by the working fluid or pressing means 213 that presses the diaphragm presser 207 to the diaphragm 208 side, and the upper stem 205 and the lower stem 206 causing the piston 211 to move in the axial direction by the manual operation.

In addition, this hybrid valve 201 includes: the piston 211 that includes a piston body 211a slidingly contacts an inner circumferential surface of a cylinder 212, a pressing shaft 211b extending toward both sides in the axial direction from the piston body 211a, and a working fluid introduction shaft 211c; a stepped cylindrical intermediate body 215 that is fixed to the bonnet 203, and an opposite side thereof from the bonnet is formed with an smaller engagement cylindrical section 215A having a diameter than a bonnet fixed side; and a cylindrical rotary body 216 that is formed with a working fluid introduction hole 216a for introducing the working fluid to a circumferential surface, the circumferential surface being coaxial with this intermediate body 215 and being fitted to the engagement cylindrical section 215A.

<Intermediate Body>

In the intermediate body 215, a pressing means storage space 215b, a central through-hole 215a, and a manual operation space 215c having different diameters from each other are continuously formed from the bonnet side. The intermediate body 215 also includes a communication hole 215d, through which the working fluid supplied from the working fluid introduction hole 216a is introduced into an internal channel 211d, and the internal channel 211d has an opening end on an end surface of the working fluid introduction shaft 211c, which is inserted in the central through-hole 215a, in the piston 211.

The intermediate body 215 further includes: the lower stem 206 that is formed with a male screw 261 on an outer circumferential surface, the male screw 261 being threaded to a female screw 215e that is formed on an inner circumferential surface of the manual operation space 215c; and the upper stem 205, one end portion of which is engaged with an engagement end portion of the lower stem 206, and the other end portion of which is projected from the manual operation space 215c and is engaged with an operation handle 204. An abutment section 262 that is an end portion on an engagement opposite side of the lower stem 206 presses the piston 211 against the diaphragm 208.

The abutment section 262 of the lower stem 206 may be configured to directly press the end surface of the working fluid introduction shaft 211c by forming a seal structure for the central through-hole 215a. However, in this embodiment, a pressing body 214 that has a seal structure on a circumferential surface is disposed between the lower stem 206 and the piston 211. In a contact end surface of this pressing body 214 with the end surface of the working fluid introduction shaft 211c, a circumferential surface is chamfered. By chamfering the circumferential surface, the communication hole 215d can lift the pressing body 214 to the lower stem 206 side by the introduced working fluid, and thus can smoothly introduce the working fluid into the internal channel 211d. Instead of chamfering of the circumferential surface, a groove that passes through a center may be formed on the end surface.

In an engagement section between the upper stem 205 and the lower stem 206, either one of end surfaces, in this embodiment, that of the lower stem 206 is formed with a pair of fan-shaped abutment sections 260, 260 having circular arcs while the other end surface, in this embodiment, that of the upper stem 205 is formed with a projected section 250. The projected section 250 has: a pair of substantially fan-shaped missing sections 250b, 250b, each of which has a longer arc length than the circular arc of the fan-shaped abutment section 260; and vertical surfaces 250a, 250a that make the surface contact with planar lateral surfaces 260a, 260a of the fan-shaped abutment section 260. In the case where both of the fan-shaped abutment section 260 and the projected section 250 have the fan shape as illustrated in FIG. 17(b), a predetermined clearance has to be provided in a central portion of one of those, so as to allow passing by the other. In the fan-shaped abutment section 260 having the circular arc, an arcuate surface 260b is also preferably provided on a center side (see FIG. 17 (a1)). A difference between the arc length of the missing section 250b and the arc length of the fan-shaped abutment section 260 serves as the play and is set for 20° in this embodiment.

Figure 18:
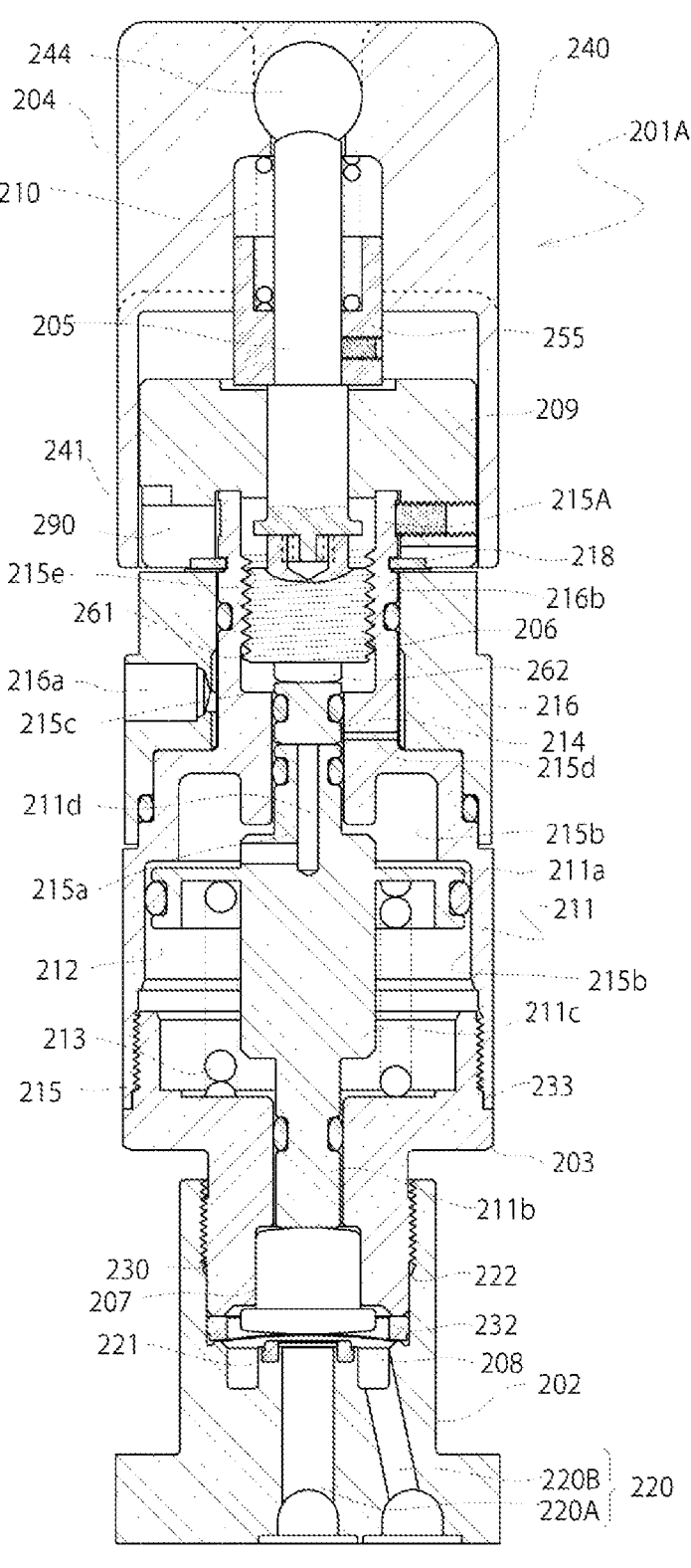
FIG. 18 is a front cross-sectional view in which another embodiment of the hybrid valve according to the invention is partially cut out.
Figure 19A:
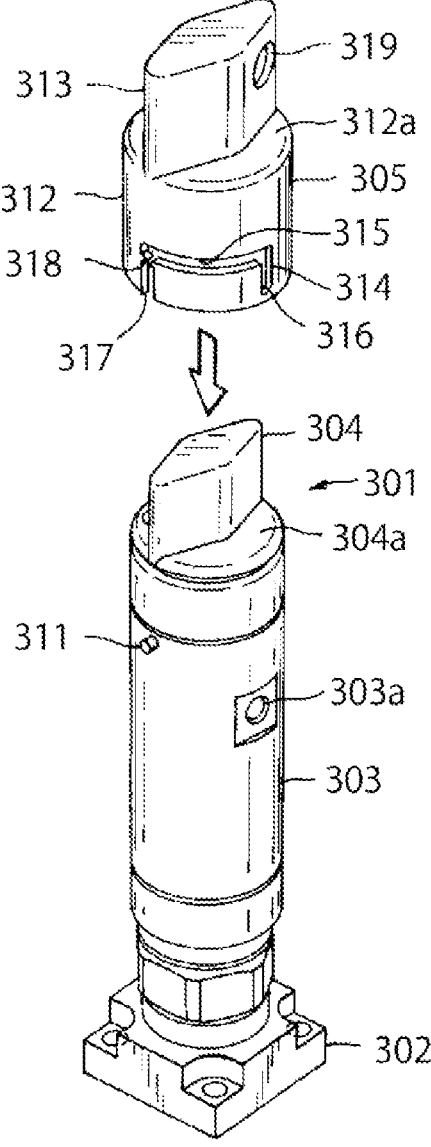
FIG. 19 illustrates a conventional valve, in which (a) is a perspective view before a handle member is attached and (b) is a perspective view of a state where the handle member is attached.
Figure 19B:
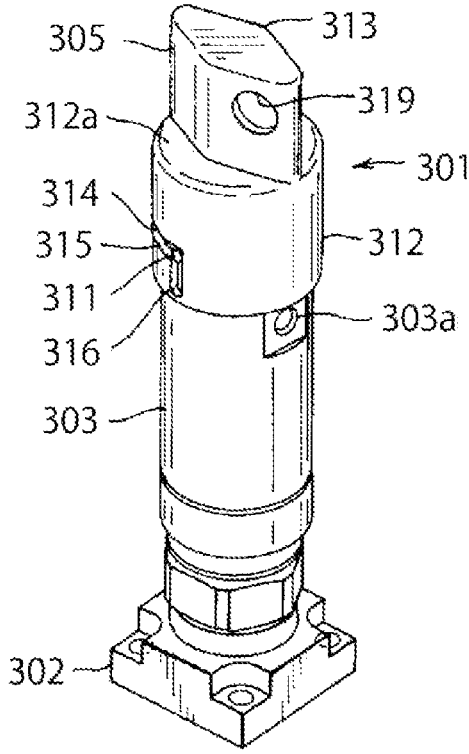
Figure 20A:
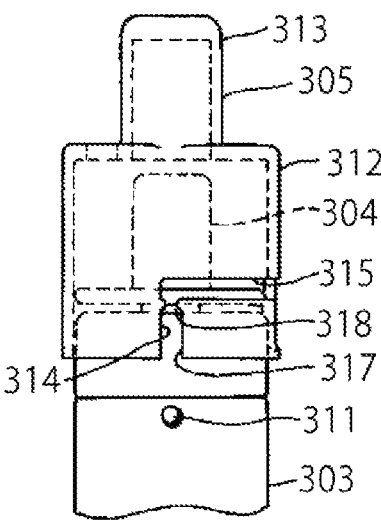
FIG. 20 illustrates the conventional valve, in which (a) is a view illustrating the state before the handle member is attached, (b) is a view illustrating a state where a guide projection of a casing is engaged with a guide groove of the handle member, (c) is a view illustrating a state where the guide projection reaches a small-diameter section of the guide groove, (d) is a view illustrating a state where the guide projection passes the small-diameter section and reaches a manual rotation guide section, and (e) is a view illustrating a state where the guide projection reaches a locked position movement guide section.
Figure 20B:
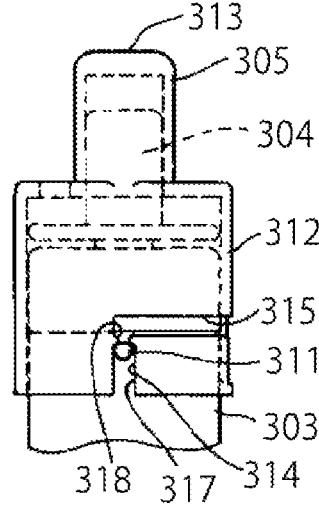
Figure 20C:
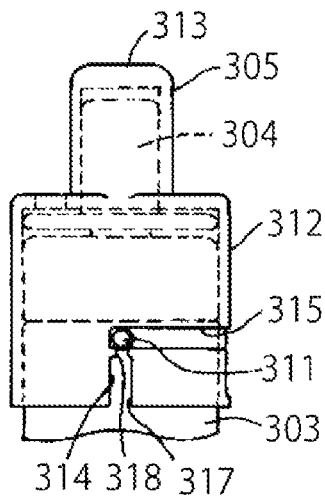
Figure 20D:
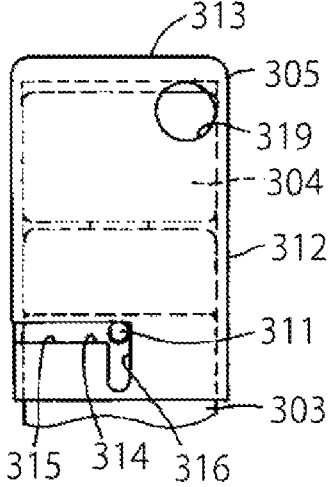
Figure 20E:
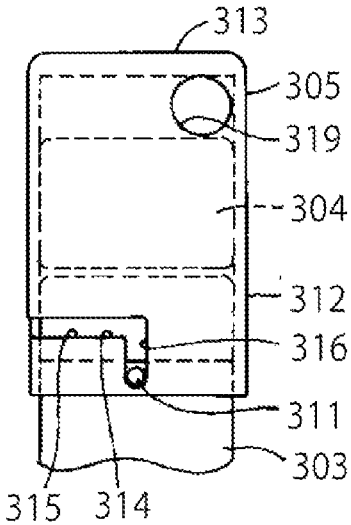
Figure 21:
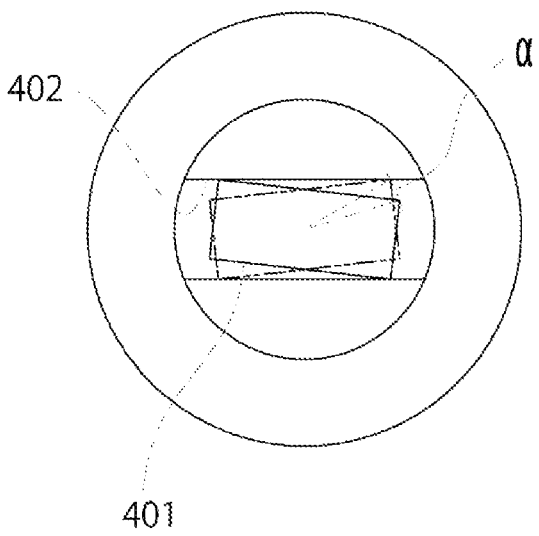
FIG. 21 is a schematic view for illustrating play in an engagement section between an upper stem and a lower stem of another conventional valve.

As described above, the one end of the upper stem 205 is formed with the projected section 250 that is engaged with the lower stem 206, and the other end thereof is inserted in a hole 242 of the operation handle 204, which will be described below. In addition, the upper stem 205 is urged to the lower stem 206 side by the urging means, such as the spring, provided on a top surface of the hole 242. In addition, the upper stem 205 is formed with a planar section that abuts a planar section 242a of this hole 242, and rotation of the operation handle 204 is thereby transmitted to the upper stem 205. As illustrated in FIG. 18, this planar section may directly be formed in the upper stem 205. However, as illustrated in FIG. 14, a cylindrical engagement piece 255 illustrated in FIG. 16(c) may be inserted in the upper stem 205 and fixed thereto by a set screw. By using the engagement piece 255, the operation handle 204 can be attached thereto while appropriately adjusting the rotational position thereof.

As described above, the one end of the lower stem 206 is formed with the fan-shaped abutment section 260 that is engaged with the upper stem 205, and the other end thereof is formed with the abutment section 262 that abuts the pressing body 214 interposed between the diaphragm presser 207 and the lower stem 206. As described above, the abutment section 262 may be configured to directly press the end surface of the working fluid introduction shaft 211c by forming the seal structure for the central through-hole 215a. In addition, a circumferential surface of the lower stem 206 is formed with the male screw 261 that is threaded to the female screw 215e formed on an inner surface of the engagement cylindrical section 215A of the intermediate body 215. Thus, when being rotated by the operation handle 204, the upper stem 205 moves in the up-down direction by a distance corresponding to the screw pitch. Consequently, the diaphragm presser 207 is pressed against the diaphragm 8, and the diaphragm 208 then abuts the valve seat 221 and can inhibit the flow of the fluid. Meanwhile, when the lower stem 206 moves upward, the diaphragm presser 207 no longer presses the diaphragm 208, and then the diaphragm 208 separates from the valve seat 221 by a self-restoring force of the diaphragm 208 and the fluid pressure in the inlet channel 220A and allows the flow of the fluid.

The valve body 202 is provided to an exemplary valve that is arranged in the accumulation system, and is exemplified that open ends of the inlet channel 220A and the outlet channel 220B are formed in a lower surface. However, it is needless to say that the valve body 202 is not limited thereto. Meanwhile, an upper surface side of the valve body 202 is formed with a recess in which the bonnet 203 is fixed, and an inner circumferential surface of the recess is formed with a female screw 222, to which a male screw 230 formed on an outer circumferential surface of the bonnet 203 is threaded.

In the hollow bonnet 203, the male screw 230 is formed on the outer circumferential surface on one end side, and is threaded to the female screw 222 that is formed on the inner circumferential surface of the recess of the valve body 202. Then, an outer circumferential edge of one end portion on this one end side presses an annular diaphragm fixture member 232 that abuts the circumferential edge of the diaphragm 208, and the diaphragm 208 is thereby fixed to the valve body 202. However, the diaphragm fixture member 232 may not be provided, and an end portion of the bonnet 203 may directly press and fix the diaphragm 208.

Meanwhile, a female screw 233, to which a male screw 215*f* of the above-described intermediate body 215 is threaded, is formed on the other end side of the bonnet 203, and the bonnet 203 and the intermediate body 215 are thereby fixed. A relationship between the male screw and the female screw may be reversed. Thus, a configuration of a so-called normal open type can be adopted that the cylinder 212, which is formed in the inner circumferential surface of the bonnet 203 in the illustrated example, is formed in the inner circumferential surface of the intermediate body 215, and the piston 211 is urged in a direction away from the diaphragm 208 by a pressing member 213.

<Rotary Body>

The rotary body 216 is formed with the working fluid introduction hole 216*a* for introducing the working fluid on the circumferential surface, and includes an inner diameter section 216*b* that is a hollow cylinder body coaxial with the intermediate body 215 and is fitted to the engagement cylindrical section 215A of the intermediate body 215. A seal member, such as an O-ring, is disposed on upper and lower sides in the axial direction between the rotary body 216 and the intermediate body 215, so as to prevent leakage of the working fluid, which is supplied from the working fluid introduction hole 216*a*, to the outside. In the illustrated example, the rotary body 216 has a stepped inner diameter to match a large-diameter section of the intermediate body 215. However, a shape of the rotary body 216 is not particularly limited, and the rotary body 216 does not have to be stepped as long as a space for disposing the seal member, which suppresses the leakage of the working fluid to the outside, can be secured.

The working fluid introduction hole 216*a*, which is formed on the circumferential surface of the rotary body 216, has a structure to attach a pipe connected to a working fluid supply source, such as a female thread or a female part of a one-touch joint.

A tip of the engagement cylindrical section 215A is projected from the rotary body 216, and an indicator 209 is fixed thereto. A circumferential surface of the indicator 209 is formed with a circumferential groove 290*a* and axial grooves 290*b*, 290*c*, each of which is used to guide a guide 243 of the operation handle 204, which will be described below. The letters [OPEN] and [CLOSE] are printed on a top surface of the indicator 209, and an opened/closed state of the valve 201 can visually be recognized through a window 245 of the operation handle. For this reason, the indicator 209 is configured to be freely rotatable with respect to the bonnet 203, be fixed at a set position by a set screw, and correctly display the printed letters when the valve is opened/closed.

Figure 15A:
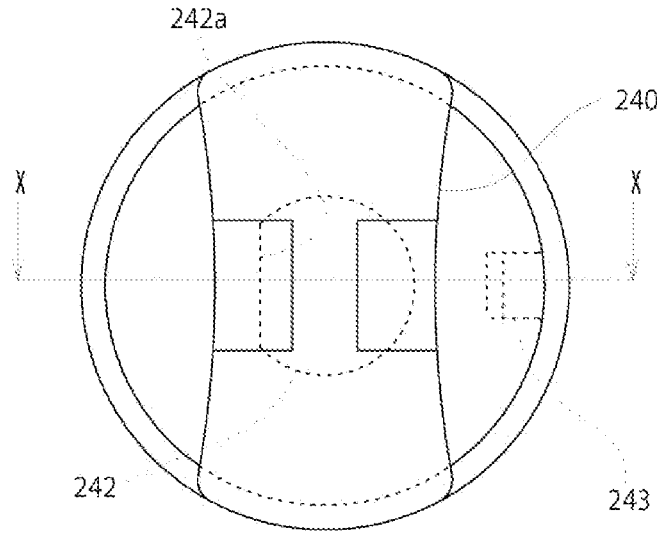
FIG. 15 illustrates an operation handle for the valve, in which (a) is a plan view, and (b) is a cross-sectional view taken along X-X in (a).
Figure 15B:
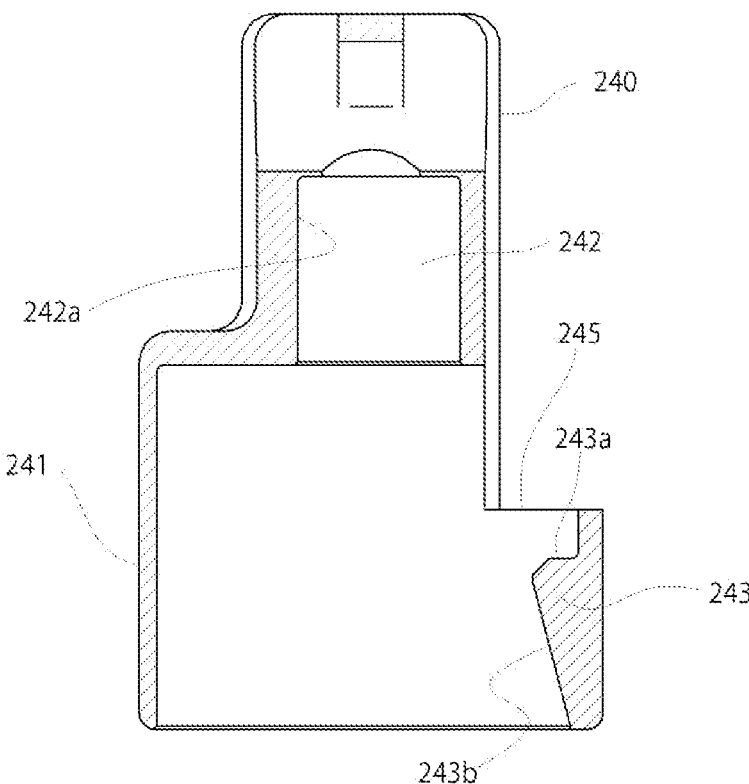

The operation handle 204 is made of the resin and includes: an operation section 240 in which the engagement section with the upper stem 205 is formed; and a cylindrical section 241 that covers the bonnet 203. However, the operation handle 204 is not limited to that made of the resin. The operation section 240 is formed with a cylindrical insertion opening 244, through which the stopper is inserted. The engagement section on the inside is the engagement hole 242, in which the one end portion of the upper stem 205 is inserted, and is partially formed with the engagement planar section 242*a* that corresponds to the planar section formed in the one columnar end portion of the upper stem 205. An inner circumferential surface of the cylindrical section 241 is formed with the guide 243 in a projection shape that is engaged with a groove 290 of the cylindrical indicator 209 fixed to the bonnet 203. As illustrated in FIG. 15(*b*), an engagement surface 243*a*, which is projected inward, is formed in an upper portion of this guide 243, and an inner portion of the guide 243 is chamfered to form an inclined surface 243*b*, which is oriented downward. The operation handle 204 is constantly urged in a direction to disengage the operation handle 204 from the upper stem 205 by urging means 210. However, since the guide 243 is engaged with an upper surface of the circumferential groove 290*a* or a top surface of the axial groove 290*b* in the groove 290, the operation handle 204 is not disengaged from the upper stem 205. In addition, the window 245 is formed at an appropriate position of the operation handle 204 (a position above the guide 243 in this embodiment), and is configured that the above-described letters printed on the top surface of the indicator 209 can visually be recognized from the outside.

Figure 16A:
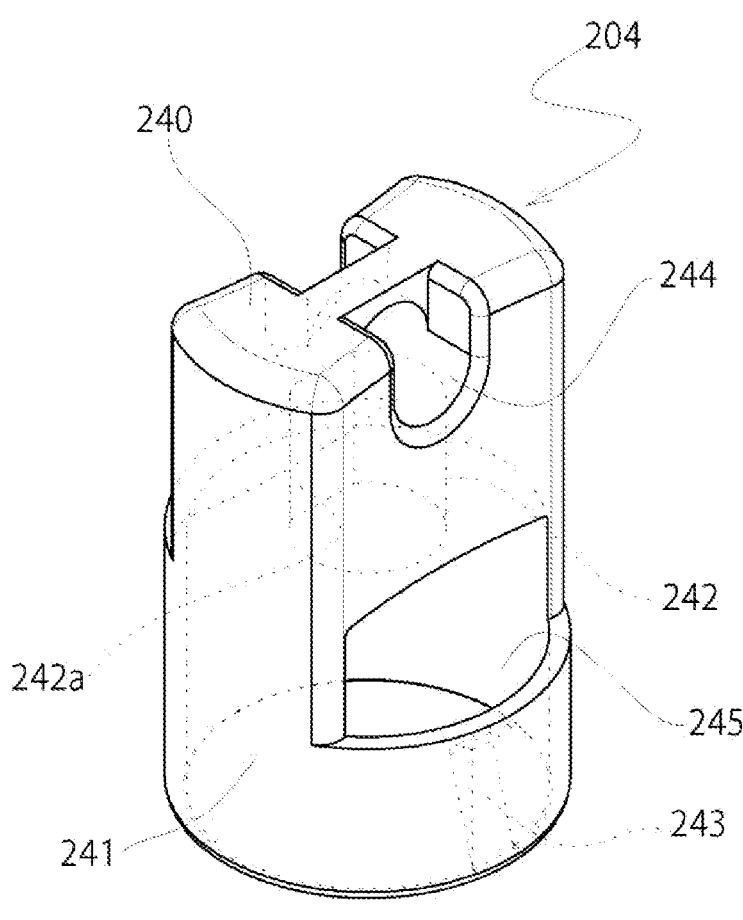
FIG. 16 illustrates components of the valve, in which (a) is a perspective view of the operation handle, (b) is a perspective view of an indicator that is fixed to a bonnet, and (c) is a perspective view of a handle engagement member.
Figure 16B:
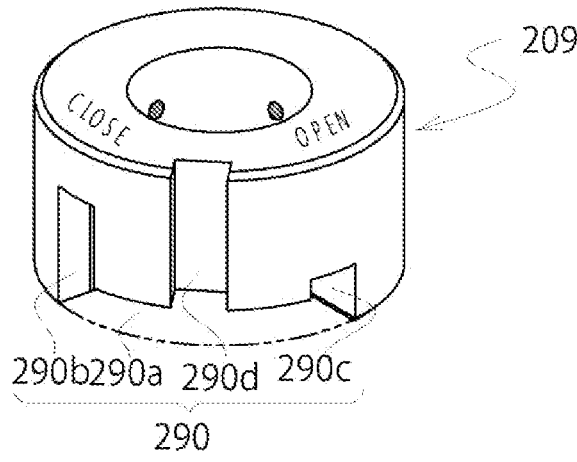
Figure 16C:
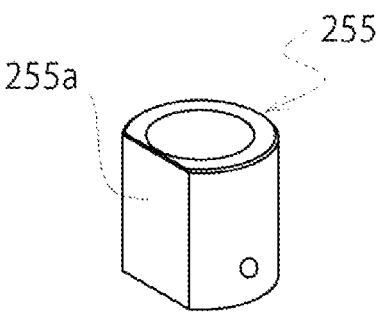

As illustrated in FIG. 16(*b*), the groove 290 of the indicator 209 is formed with: the circumferential groove 290*a* on a lower end side of the indicator 209; and the axial grooves 290*b*, 290*c*, each of which extends toward an upper end side and is provided at each end of the circumferential groove 290*a*. As the axial grooves, in each of which the guide 243 moves in the axial direction in the fully closed or fully open state of the valve, the axial groove 290*b* at the fully-closed position and the axial groove 290*c* at the fully-open position are provided, and each thereof includes the top surface that restricts upward movement of the guide 243. This top surface is engaged with the engagement surface 243*a* of the guide 243 and functions as the stopper. An axial groove 290*d*, which is provided between the axial grooves 290*b*, 290*c* and does not have a top surface, is an axial groove, through which the guide 243 passes when the operation handle 204 is attached, and has a width that is less than the other axial grooves and is slightly greater than the width of the guide 243. The axial groove 290*d* is also shallow in groove depth, and the operation handle is attached thereto while being elastically deformed. In this way, the axial groove 290*d* prevents falling of the operation handle 204 during the normal operation.

In the valve 201, the bonnet 203 is screwed and fixed to the valve body 202 in a state where the diaphragm presser 207 is arranged in the bonnet 203 and where the diaphragm 208 and the diaphragm fixture member 232 are placed on the valve seat 221 of the valve body 202. Thereafter, the piston 211 and the pressing member 213 are attached to the bonnet 203, and the intermediate body 215 is screwed and fixed to the bonnet 203. The pressing body 214 is arranged in the central through-hole 215*a*, and the lower stem 206 is threaded to the intermediate body 215. Since the hybrid valve 201 in the illustrated example is of the normally closed type, the diaphragm presser 207 is in the state of pressing the diaphragm 208 to the seat 221 side in the state where the pressing member 213 is arranged and the intermediate body 215 is fixed to the bonnet 203. In this state, the stem is set in the state of being rotated from the fully-open position to a 45° closed position. Thereafter, the rotational positions of the indicator 209 and the engagement piece 255 are adjusted, the rotary body 216 is then fitted to the engagement cylindrical section 215A of the intermediate body 215, and a retaining ring 218 is engaged with a groove that is formed near an end portion of the engagement cylindrical section 215A. In this way, falling of the rotary body 216 is prevented. A washer or the like is interposed between the retaining ring 218 and an end surface of the rotary body 216. In particular, a material having a high sliding property and a low friction coefficient is preferably selected for a surface of this washer, so as to allow smooth rotation of the rotary body 216.

When the operation handle 204 is attached to the upper stem 205 such that the planar section 242a of the hole 242 follows the planar section (a planar section 255a of the engagement piece 255), the guide 243 of the operation handle 204 can be attached along the axial attachment groove 290d of the axial grooves in the indicator 209. When the guide 243 reaches the circumferential groove 290a, the operation handle 204 is rotated to the fully-closed or fully-open position. Then, assembly of the hybrid valve 201 is completed.

In the hybrid valve 201 having the above configuration, the rotary body 216 is coaxial with the intermediate body 215, and the working fluid introduction hole 216a can be directed to any of 360° circumferential positions. In this way, even in the case where the hybrid valve 201 is used in an integrated gas system in which fluid control devices including the valve are tightly arranged, it is possible to connect the pipe to the working fluid supply source without difficulty.

Next, a description will be made on rotary operation of this hybrid valve 201 during the manual operation.

Figure 17:
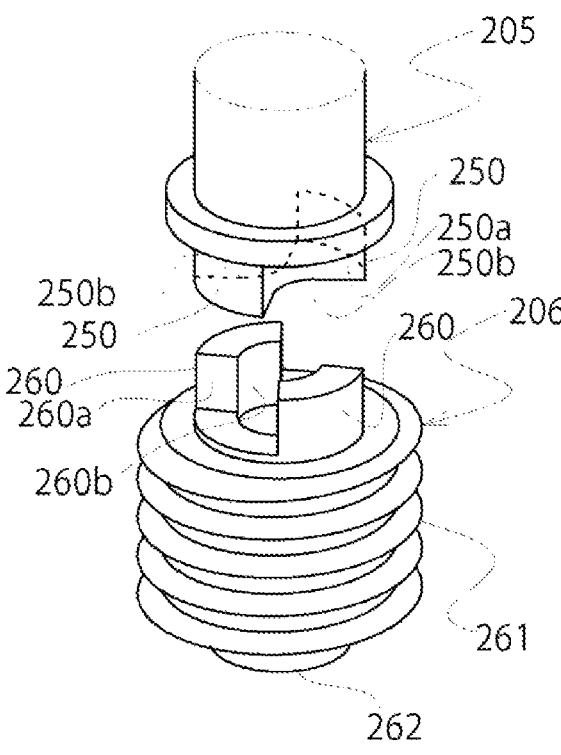
FIG. 17 illustrates an engagement section of a stem in the valve, in which (a1) is a perspective view of a state before engagement that is partially cut out, (a2) is a perspective view of an engagement state that is partially cut out, (b) is a perspective view of a state before engagement in another example that is partially cut out, (c1) is a plan view of the engagement section in a state before an upper stem (the operation handle) is rotated, (c2) is a plan view of the engagement section in a state where rotation is started and a vertical surface of a projected section abuts a planar lateral surface of a fan-shaped abutment section, and (c3) is a plan view of the engagement section in a state of being further rotated 90°.
Figure 17:
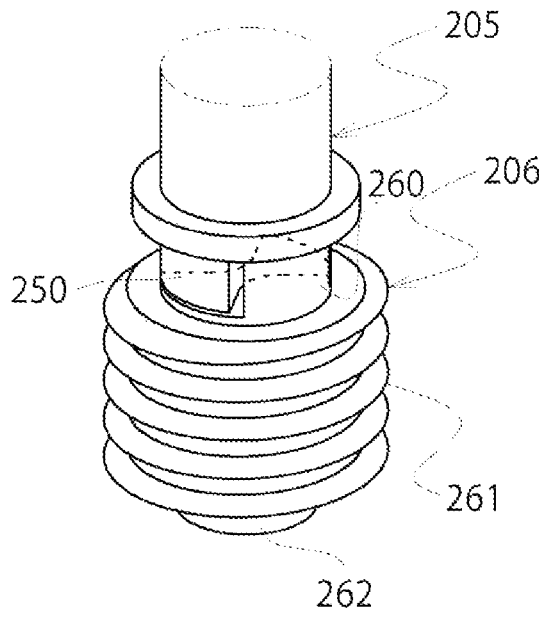
Figure 17B:
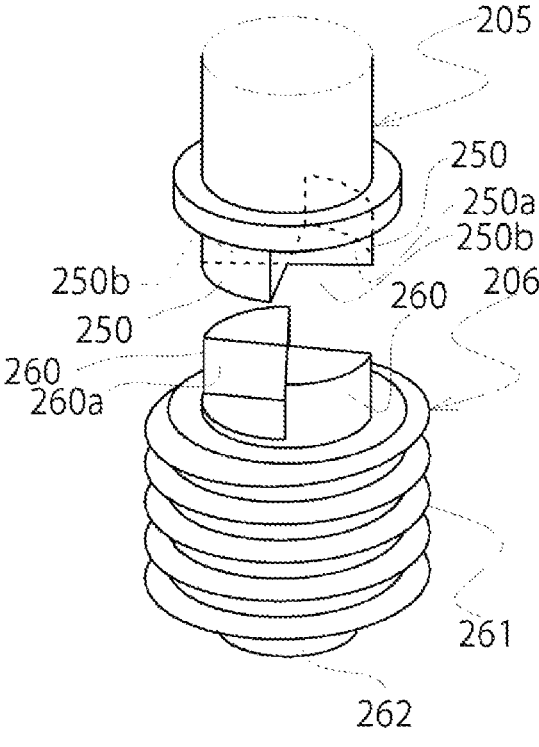

First, in the engagement section between the upper stem 205 and the lower stem 206, the rotational operation is started from a position at which the operation handle 204 is rotated 10° clockwise from a position in FIG. 17 (c1) (the valve fully-closed state). While the operation handle 204 is pushed in against the urging means 210 and is rotated 10° (20° from the initial state) counterclockwise from FIG. 17 (c1), the upper stem 205 is rotated in conjunction with the operation handle 204. However, the force in the rotational direction is not applied to the lower stem 206, thus the lower stem 206 is not rotated and does not move in the up-down direction. With this play, even in the case where the guide 243 is detached from the axial grooves 290b, 290c, and the operation handle 204 is slightly rotated due to hitting of the worker's body against the operation handle 204 or the generation of the vibration when the opening/closing work is not performed, the lower stem 206 is not rotated, a positional relationship between the diaphragm 208 and the valve seat 221 is not changed, and the fluid does not flow or is not blocked unexpectedly.

Next, in the state in FIG. 17 (c2), the vertical surface 250a of the projected section 250 in the upper stem 205 abuts the planar lateral surface 260a of the fan-shaped abutment section 260 in the lower stem 206. At this time, the engagement between the upper stem 205 and the lower stem 206 becomes the engagement achieved by the surface contact. Thus, when the operation handle 204 is rotated counterclockwise from the state in FIG. 17 (c2), the reaction force that the vertical surface 250a receives from the planar lateral surface 260a is dispersed over the surface and thus becomes smaller than that in the case of the linear contact. Thus, the operation by the operation handle 204 is smooth, and the worker does not sense the play of the rotation.

Then, when the operation handle 204 is rotated 90° counterclockwise from the state in FIG. 17 (c2), the lower stem 6 is also rotated 90°. Consequently, the male screw 261, which is threaded to the female screw 215e formed on the inner surface of the engagement cylindrical section 215A of the intermediate body 215, in the lower stem 206 moves upward by a pitch of the rotation for 90°, the abutment section 262 separates from the diaphragm presser 207, and the diaphragm 208 is brought into the fully open state where the diaphragm 208 separates from the valve seat 221 by the self-restoring force of the diaphragm 208 and the fluid pressure in the inlet channel 220A.

Sixth Embodiment

FIG. 18 illustrates a hybrid valve 201A in a sixth embodiment of the invention. This hybrid valve 201A is a hybrid valve of the so-called normally open type in which the male screw for threading the other end side (an opposite body side) of the bonnet 203 and the bonnet of the intermediate body 215 is reversed from that in the fifth embodiment, in which the cylinder 212 formed in the inner circumferential surface of the bonnet 203 illustrated in FIG. 14 is formed in the inner circumferential surface of the intermediate body 215, and in which the piston 211 is urged in the direction away from the diaphragm 208 by the pressing member 213. The pressing means storage space 215b of the intermediate body 215 forms a storage space for the pressing member 213 jointly with an internal space of the bonnet 203, and the circumferential surface constitutes the cylinder 212.

The rest of the configuration is the same as that in the fifth embodiment, and thus the description thereon will not be made. A waste filtration valve 201A in this embodiment can include the same components as the hybrid valve 201 in the fifth embodiment, except for the bonnet 203, the cylinder 212, the intermediate body 215, and the pressing means 213. The spring as the pressing means 213 can be the same component by adjusting an axial length of the pressing means storage space 215b.

In regard to the hybrid valve according to the invention (8), the pipe can easily be connected to the working fluid supply source even in the small space where it is difficult to perform such connection work of the pipe connecting the working fluid supply source. Thus, the hybrid valve according to the invention (8) can suitably be used as the hybrid valve that is used in the integrated gas system with the small installation space, for example.

INDUSTRIAL APPLICABILITY

The valve according to the invention can effectively prevent the unexpected stop or outflow of the working fluid, and thus can suitably be used as the valve for an integrated gas supply apparatus used in semiconductor manufacturing equipment, for example.

REFERENCE SIGNS LIST

1: valve
2: valve body
20: fluid channel
21: valve seat
3: bonnet
30: male screw
31: female screw
4: operation handle
42: engagement hole
42a: planar section
42b: planar section
5: engagement member
50: planar section
51: planar section 6: stem
61: male screw
62: abutment section
7: diaphragm presser
8: diaphragm
9: indicator
90: groove
101: valve
102: valve body
120: fluid channel
121: valve seat
103: bonnet
130: male screw
131: female screw
104: operation handle
105: upper stem
150: projected section
150*a*: vertical surface
106: lower stem
160: fan-shaped abutment section
160*a*: planar lateral surface
161: male screw
162: abutment section
107: diaphragm presser
108: diaphragm
109: indicator
190: groove
201: valve
211: piston
212: cylinder
213: pressing member
214: pressing body
215: intermediate body
215A: engagement cylindrical section
215*a*: central through-hole
216: rotary body
216*a*: working fluid introduction hole
202: valve body
220: fluid channel
221: valve seat
203: bonnet
230: female screw
204: operation handle
205: upper stem
206: lower stem
261: male screw
262: abutment section
207: diaphragm presser
208: diaphragm

The invention claimed is:

1. A valve comprising:
a valve body that is formed therein with a fluid channel and a valve seat arranged in the fluid channel;
a diaphragm that abuts and separates from a seat surface of the valve seat;
a hollow bonnet that fixes a circumferential edge of the diaphragm to the valve body;
a diaphragm presser that abuts the diaphragm and presses the diaphragm against the valve seat; and
a stem, one end portion of which is formed with a male screw on an outer circumferential surface, and another end portion of which is projected from the bonnet and is engaged with an engagement hole, the male screw being threaded to a female screw formed on an inner circumferential surface of the bonnet, and the engagement hole being formed in a central portion of an inner surface of an operation handle, wherein an end portion of said stem, opposite from said one end portion, forms a tip;
a part of said tip is in the form of a convex circumferential surface having edges connected by a first connecting surface;
a part of said engagement hole is in the form of a concave surface having edges connected by a second connecting surface;
said first and second connecting surfaces are in engagement with each other; and
one of said first and second connecting surfaces is in the form of a plane, and the other of said first and second connecting surfaces comprises two flat portions disposed at a predetermined oblique angle relative to each other, said predetermined oblique angle being such as to generate predetermined play when the operation handle is rotated in one direction after being rotated in another direction.

2. The valve according to claim 1 wherein a piston and a cylinder are arranged between the diaphragm presser and the stem, the piston moving in the axial direction by a working fluid.

3. The valve according to claim 1, wherein
the operation handle includes an operation section and a cylindrical section that covers the bonnet,
an inner circumferential surface of the cylindrical section is formed with a projected guide that is engaged with a groove of a cylindrical indicator fixed to the bonnet,
the operation handle is constantly urged by urging means in a direction to cancel engagement between the operation handle and the stem, and
the groove is formed with a circumferential groove and an axial groove in which the guide moves in an axial direction when the valve is in a fully closed or fully open state.

4. The valve according to claim 3, wherein a piston and a cylinder are arranged between the diaphragm presser and the stem, the piston moving in the axial direction by a working fluid.

5. The valve according to claim 1, wherein a cylindrical engagement member that is engaged with the engagement hole is attached to the tip of another end portion of the stem.

6. The valve according to claim 5, wherein a piston and a cylinder are arranged between the diaphragm presser and the stem, the piston moving in the axial direction by a working fluid.

7. The valve according to claim 5, wherein
the operation handle includes an operation section and a cylindrical section that covers the bonnet,
an inner circumferential surface of the cylindrical section is formed with a projected guide that is engaged with a groove of a cylindrical indicator fixed to the bonnet,
the operation handle is constantly urged by urging means in a direction to cancel engagement between the operation handle and the stem, and
the groove is formed with a circumferential groove and an axial groove in which the guide moves in an axial direction when the valve is in a fully closed or fully open state.

8. The valve according to claim 7, wherein a piston and a cylinder are arranged between the diaphragm presser and the stem, the piston moving in the axial direction by a working fluid.

9. A valve comprising:
a valve body that is formed therein with a fluid channel and a valve seat arranged in the fluid channel;

a diaphragm that abuts and separates from a seat surface of the valve seat;

a hollow bonnet that fixes a circumferential edge of the diaphragm to the valve body;

a diaphragm presser that abuts the diaphragm and presses the diaphragm to the valve seat side;

a lower stem that is formed with a male screw on an outer circumferential surface, the male screw being threaded to a female screw that is formed on an inner circumferential surface of the bonnet; and an upper stem, one end portion of which is engaged with the lower stem, and another end portion of which is projected from the bonnet and is engaged with an operation handle, wherein in an engagement section between the upper stem and the lower stem, either one of end surfaces is formed with a pair of fan-shaped abutment sections, and the other end surface is formed with a projected section, the projected section having: a pair of substantially fan-shaped missing sections, each of which has a longer arc length than a circular arc of the fan-shaped abutment section; and a vertical surface that makes surface contact with a planar lateral surface of the fan-shaped abutment section.

10. The valve according to claim 9, wherein a piston and a cylinder are arranged between the diaphragm presser and the lower stem, the piston being movable in the axial direction by a working fluid.

11. The valve according to claim 9, wherein the operation handle includes an operation section and a cylindrical section that covers the bonnet, an inner circumferential surface of the cylindrical section is formed with a projected guide that is engaged with a groove of a cylindrical indicator fixed to the bonnet, the operation handle is constantly urged by urging means in a direction to cancel engagement between the operation handle and the upper stem, and the groove is formed with a circumferential groove and an axial groove in which the guide moves in an axial direction when the valve is in a fully closed or fully open state.

12. The valve according to claim 11, wherein a piston and a cylinder are arranged between the diaphragm presser and the lower stem, the piston moving in the axial direction by a working fluid.

13. A hybrid valve comprising:

a valve body that is formed therein with a fluid channel; and a valve seat arranged in the fluid channel;

a diaphragm that abuts and separates from a seat surface of the valve seat;

a hollow bonnet that fixes a circumferential edge of the diaphragm to the valve body;

a diaphragm presser that abuts the diaphragm and presses the diaphragm against the valve seat side; and a piston that causes the diaphragm presser to move in an axial direction by a working fluid or pressing means, and a stem that causes the piston to move in the axial direction by a manual operation, the hybrid valve having:

the piston having a piston body, a pressing shaft, and a working fluid introduction shaft, the piston body slidingly contacting an inner circumferential surface of a cylinder, and the pressing shaft extending both sides in the axial direction from the piston body;

a stepped cylindrical intermediate body that is fixed to the bonnet and is formed with an engagement cylindrical section on an opposite bonnet side, the engagement cylindrical section having a smaller diameter than a bonnet fixed side; and a rotary body that is formed with a working fluid introduction hole, through which the working fluid is introduced to a circumferential surface fitted to the engagement cylindrical section, wherein the intermediate body is formed therein with a central through-hole, to which the working fluid introduction shaft is fitted, and a communication hole that connects an internal channel of the working fluid introduction shaft and the working fluid introduction hole.

14. The hybrid valve according to claim 13, wherein the stem includes: a lower stem that is formed with a male screw on an outer circumferential surface, and one end of which presses the piston to the diaphragm side, the male screw being threaded to a female screw that is formed on an inner circumferential surface of the manual operation space; and an upper stem, one end portion of which is engaged with an engagement end portion formed at another end of the lower stem, and another end portion of which is projected from the manual operation space and is engaged with an operation handle, the operation handle includes an operation section and a cylindrical section that covers a tip of the engagement cylindrical section, an inner circumferential surface of the cylindrical section is formed with a projected guide that is engaged with a groove of a cylindrical indicator fixed to the engagement cylindrical section, the operation handle is constantly urged by urging means in a direction to cancel engagement between the operation handle and the upper stem, and the groove is formed with a circumferential groove and an axial groove in which the guide moves in an axial direction when the valve is in a fully closed or fully open state.

* * * * *